United States Patent
Zimmerman et al.

(10) Patent No.: US 10,704,637 B2
(45) Date of Patent: Jul. 7, 2020

(54) BAR PIN BUSHING FOR VEHICLE SUSPENSION

(71) Applicant: Hendrickson USA, L.L.C., Itasca, IL (US)

(72) Inventors: Randy Joseph Zimmerman, Spencerville, IN (US); Hormoz Kerendian, Buffalo Grove, IL (US); James Merriman, Fort Wayne, IN (US)

(73) Assignee: Hendrickson USA, L.L.C., Itasca, IL (US)

( * ) Notice: Subject to any disclaimer, the term of this patent is extended or adjusted under 35 U.S.C. 154(b) by 683 days.

(21) Appl. No.: 15/239,611

(22) Filed: Aug. 17, 2016

(65) Prior Publication Data

US 2017/0051804 A1    Feb. 23, 2017

Related U.S. Application Data

(60) Provisional application No. 62/206,584, filed on Aug. 18, 2015.

(51) Int. Cl.
  *F16F 1/38*     (2006.01)
  *F16C 11/04*    (2006.01)

(52) U.S. Cl.
  CPC ............ *F16F 1/3863* (2013.01); *F16C 11/04* (2013.01); *F16F 1/3842* (2013.01); *F16F 2226/04* (2013.01); *F16F 2228/08* (2013.01)

(58) Field of Classification Search
  CPC ...... F16F 1/38; F16F 1/3863; B60G 2204/41; B60G 2204/4102; Y10T 403/451; Y10T 403/452; Y10T 403/455; Y10T 403/456
  See application file for complete search history.

(56) References Cited

U.S. PATENT DOCUMENTS

| 2,562,381 | A | | 7/1951 | Goldsmith |
| 3,976,338 | A | * | 8/1976 | Trachte ............... B60G 7/02 384/220 |

(Continued)

FOREIGN PATENT DOCUMENTS

| CN | 1692237 | 11/2005 |
| DE | 44 28 870 C1 | 11/1995 |

(Continued)

OTHER PUBLICATIONS

Supplier Drawing for Part No. 86CX020C01, Part Description 159 mm CTRS BAR PIN BUSH, Taco Hendrickson Suspensions PVT LTD., 2009, 1 page.

(Continued)

*Primary Examiner* — Daniel J Wiley
(74) *Attorney, Agent, or Firm* — McDonnell Boehnen Hulbert & Berghoff, LLP

(57) ABSTRACT

A bar pin bushing assembly for connecting components including a bar pin having at least one end with at least one bore to receive a fastener, the bar pin having a central portion having a diameter that is greater than a width or diameter of the at least one end of the bar pin, a compressible rubber section having a uniform thickness positioned around the central portion of the bar pin, the compressible rubber section further extending around downwardly tapering surfaces adjacent the central portion of the bar pin, a plurality of outer metal shells mold bonded to the compressible rubber section, wherein when the bushing assembly is inserted into a hub, the plurality of outer metal shells are configured to radially compress the compressible rubber section to provide a precompressed bushing assembly. A method of assembling the bar pin bushing assembly is also disclosed.

27 Claims, 15 Drawing Sheets

(56) References Cited

U.S. PATENT DOCUMENTS

| | | |
|---|---|---|
| 3,980,073 A | 9/1976 | Shaw, IV |
| 4,080,013 A | 3/1978 | Koch |
| 4,765,757 A | 8/1988 | Hartl |
| 5,846,014 A | 12/1998 | Hamilton |
| 5,996,981 A | 12/1999 | Dilling |
| 8,579,510 B2 | 11/2013 | Noble et al. |
| 2003/0072609 A1 | 4/2003 | Bohne et al. |
| 2005/0153781 A1 | 7/2005 | Buhl et al. |
| 2007/0077532 A1 | 4/2007 | Harter |
| 2011/0116731 A1 | 5/2011 | McLaughlin |
| 2014/0191486 A1 | 7/2014 | Rarey et al. |
| 2015/0014906 A1 | 1/2015 | Shinobu et al. |
| 2016/0347145 A1 | 12/2016 | Keeler et al. |

FOREIGN PATENT DOCUMENTS

| | | |
|---|---|---|
| EP | 0 380 403 A1 | 8/1990 |
| GB | 637901 | 5/1950 |
| WO | 2008/074507 A1 | 6/2008 |
| WO | 2009/125238 | 10/2009 |
| WO | 2009/127205 | 10/2009 |
| WO | 2017/031266 A1 | 2/2017 |
| WO | 2017027574 A1 | 2/2017 |

OTHER PUBLICATIONS pre-2015 image of Trelleborg spherical torque rod bushing, 1 page.
International Searching Authority, International Search Report and Written Opinion dated Nov. 29, 2016, issued in connection with International Application No. PCT/US2016/047460, filed Aug. 18, 2016, 17 pages.
The International Search Report (ISR) with Written Opinion for PCT/US2019/012932 dated Jun. 27, 2019, pp. 1-18.
European Patent Office (EPO) Official Letter for European Patent Application No. 16757459.9 dated Aug. 9, 2019, pp. 1-13.
English Translation of Chinese Search Report for CN Application No. 2016800479954 dated Jul. 3, 2019, pp. 1-3.
English Translation of Chinese Office Action for CN Application No. 2016800479954 dated Jul. 3, 2019, pp. 1-9.

* cited by examiner

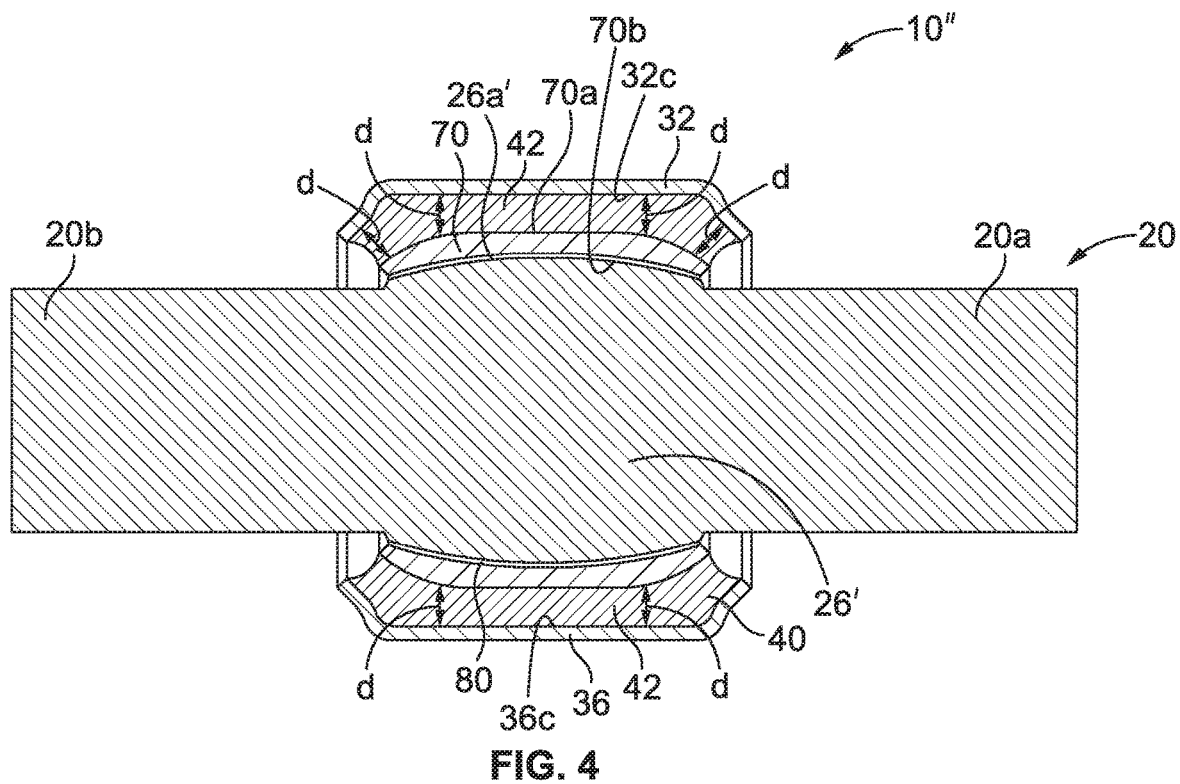
FIG. 4
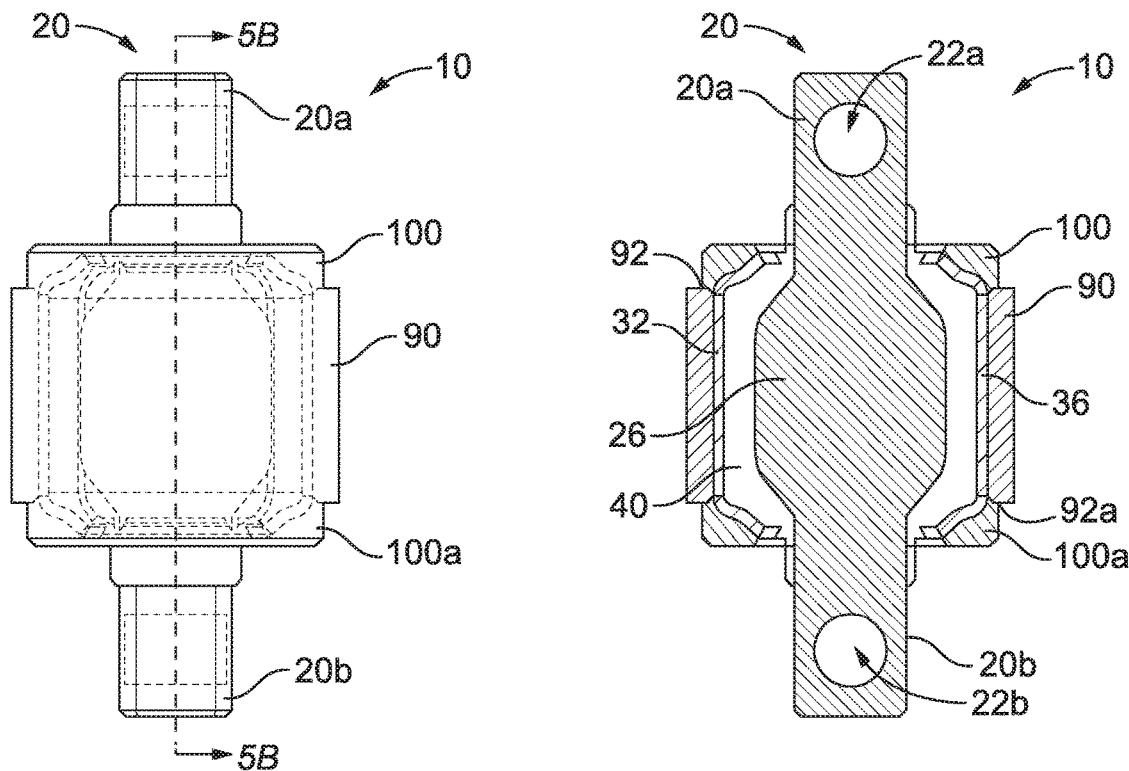
FIG. 5A  FIG. 5B

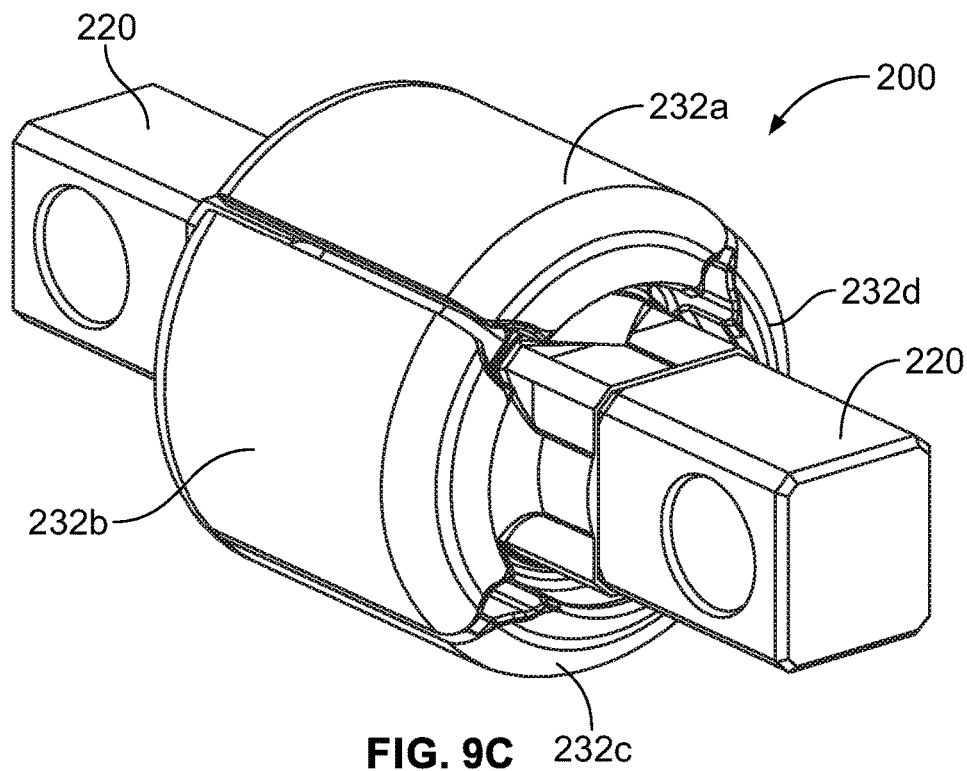
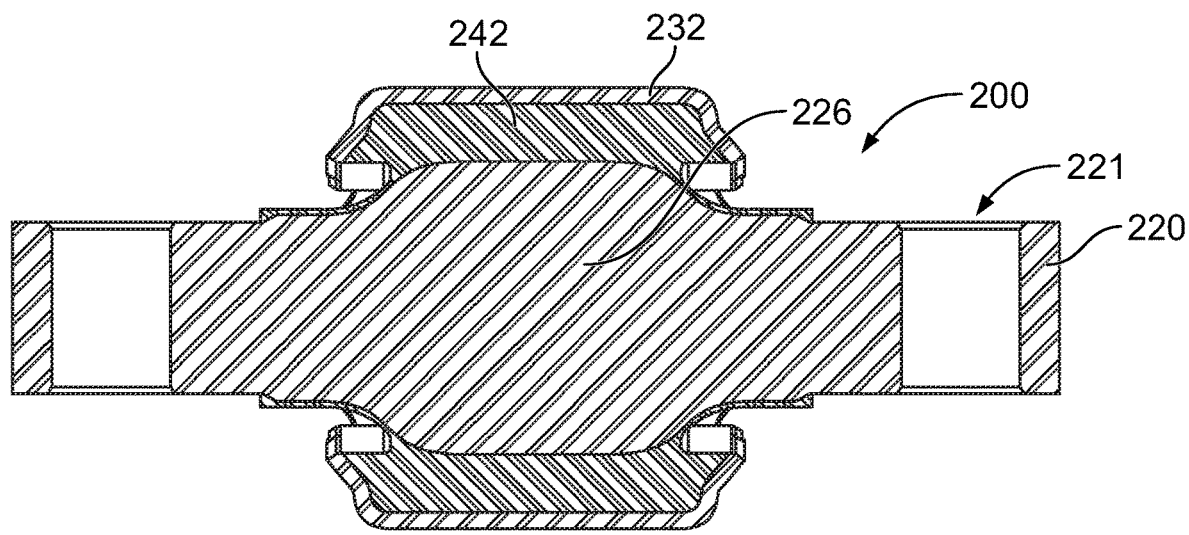
FIG. 9D

BAR PIN BUSHING FOR VEHICLE SUSPENSION

PRIORITY CLAIM

This application claims priority to Provisional Application No. 62/206,584 filed on Aug. 18, 2015, herein incorporated by reference in its entirety.

BACKGROUND

The present application generally relates to bushings used to connect components in vehicular systems, such as suspension and axle systems/subsystems. More particularly, the present application relates to an improved spherical beam end bushing useful for use in heavy haul truck applications.

Bar pin bushing assemblies for use in vehicular systems, such as suspensions, are known. Such assemblies may be used to connect different components of a vehicular system, such as beams, brackets, arms, clamps, frames, rails, rods, and other like components. A rotatable bar pin bushing is disclosed in U.S. Pat. No. 8,579,510 issued Nov. 12, 2013. Spherical rubber bushing designs have also been designed using snap rings to hold the parts together. Modest levels of precompression of the rubber may be achieved by loading in the axial direction.

In heavy truck applications, with high articulation angles, bushings must be very robust to withstand the high radial and axial loads, and high articulation angles that may be encountered in operation. Bushing designs with snap ring connections are not robust for heavy truck applications. In heavy truck applications, high radial and axial load-capacity is desirable.

In view of the conditions identified above with respect to prior bar pin bushing assemblies for vehicular systems, such as suspensions and axle systems/subsystems, it is desired to provide a new and improved bar pin bushing assembly useful for heavy truck applications, where high radial and axial loading may be encountered, and high articulation angles may be required. It is desired to provide a bar pin bushing assembly that allows for more uniform stress distribution for improved bushing fatigue and improved radial and axial load-carrying capacities.

SUMMARY

Disclosed herein is a bar pin bushing assembly for connecting components in a vehicular system, such as a suspension or axle system/subsystem. The bushing assembly includes a bar pin, a compressible rubber section having a uniform thickness that is positioned around a central portion of the bar pin, and advantageously includes a plurality of outer metal shell segments that are mold bonded to the compressible rubber section. When the bushing is inserted into a beam hub, the plurality of outer metal shells are moved radially inwardly to compress the compressible rubber section to provide for a significantly precompressed rubber bushing assembly. Such precompression, along with the uniform thickness of the rubber section, provide for more uniform stress distribution and improved bushing fatigue, and also allow for higher radial and axial load-carrying capacity. The bar pin, compressible rubber section, and plurality of outer metal shells may also advantageously be inserted into a tubular outer metal wall to provide increased hoop strength at the ends of the bar pin bushing assembly.

Additionally, axial or longitudinal voids may be formed in the compressible rubber section during the molding process. As the plurality of outer metal shells are moved radially inwardly to compress the compressible rubber section during insertion into a beam hub, the rubber may move into the voids, and the longitudinal edges of the plurality of outer metal shells may be brought together. Further, various collar arrangements are disclosed to provide for additional hoop strength and increased strength to the bushing assemblies after they have been inserted into the end of a beam hub.

In one aspect, a bar pin bushing assembly for connecting components in a vehicular system is provided including a bar pin having at least one end with at least one bore to receive a fastener, the at least one bore extending through the at least one end, the bar pin having a central portion having a diameter that is greater than a width or diameter of the at least one end of the bar pin, a compressible rubber section having a uniform thickness positioned around the central portion of the bar pin, the compressible rubber section further extending around downwardly tapering surfaces adjacent the central portion of the bar pin, a plurality of outer metal shells mold bonded to the compressible rubber section, wherein when the bushing assembly is inserted into a hub or a tubular outer metal wall, the plurality of outer metal shells are configured to radially compress the compressible rubber section to provide a precompressed bushing assembly.

Also disclosed herein is a method for assembling the bar pin bushing assembly including the steps of (i) providing a bar pin having at least one end with at least one bore to receive a fastener, the at least one bore extending through the at least one end, the bar pin having a central portion having a diameter that is greater than a width or diameter of the at least one end of the bar pin; (ii) positioning a plurality of outer metal shells about the bar pin; (iii) injecting molten rubber into a spacing between the central portion of the bar pin and inner surfaces of the plurality of outer metal shells; (iv) molding a compressible rubber section having a uniform thickness over the central portion of the bar pin; and (v) mold bonding the plurality of outer metal shells to the compressible rubber section. The method may further include the step of inserting the bar pin, compressible rubber section, and plurality of outer metal shells into a tubular outer metal wall, and crimping the ends of the tubular outer metal wall.

In a further aspect, a bar pin bushing assembly for connecting components in a vehicular system is provided including a bar pin having at least one end with at least one bore to receive a fastener, the at least one bore extending through the at least one end, the bar pin having a central portion having a diameter that is greater than a width or diameter of the at least one end of the bar pin, a plurality of lobes of compressible rubber sections having a uniform thickness positioned around the central portion of the bar pin, the plurality of lobes of compressible rubber sections further extending around downwardly tapering surfaces adjacent the central portion of the bar pin, wherein the plurality of lobes of compressible rubber sections are positioned within an tubular outer metal wall and the compressible rubber sections are compressed upon insertion into the tubular outer metal wall to provide a precompressed bushing assembly.

In yet another aspect, a method of assembling a bar pin bushing assembly is provided, including the steps of (i) providing a bar pin having at least one end with at least one bore to receive a fastener, the at least one bore extending through the at least one end, the bar pin having a central portion having a diameter that is greater than a width or diameter of the at least one end of the bar pin; (ii) positioning a plurality of lobes of compressible rubber sections having a uniform thickness over the central portion of the bar pin, and extending the compressible rubber sections around downwardly tapering surfaces of the bar pin adjacent the central portion of the bar pin; and (iii) inserting the bar pin and compressible rubber sections into a tubular outer metal wall.

BRIEF DESCRIPTION OF THE DRAWINGS

Exemplary embodiments of the invention are described herein with reference to the drawings, wherein like parts are designated by like reference numerals, and wherein:

FIG. 4 is a cross-sectional front view of bar pin bushing assembly 10" further including rubber layer 80 and intermediate sleeve 70.

FIG. 5A is front view of bar pin bushing assembly 10 after insertion into beam hub 90, with internal structure shown in dotted lines, and including collars 100 and 100a.

FIG. 5B is a cross-sectional front view of bar pin bushing assembly 10 of FIG. 5A shown within beam hub 90, and including collars 100 and 100a.

FIG. 9C is a perspective view of bar pin bushing assembly 200, shown in FIG. 9B.

FIG. 9D is a cross-sectional view of bar pin bushing 200 shown in FIGS. 9B and 9C.

DETAILED DESCRIPTION

Figure 1A:
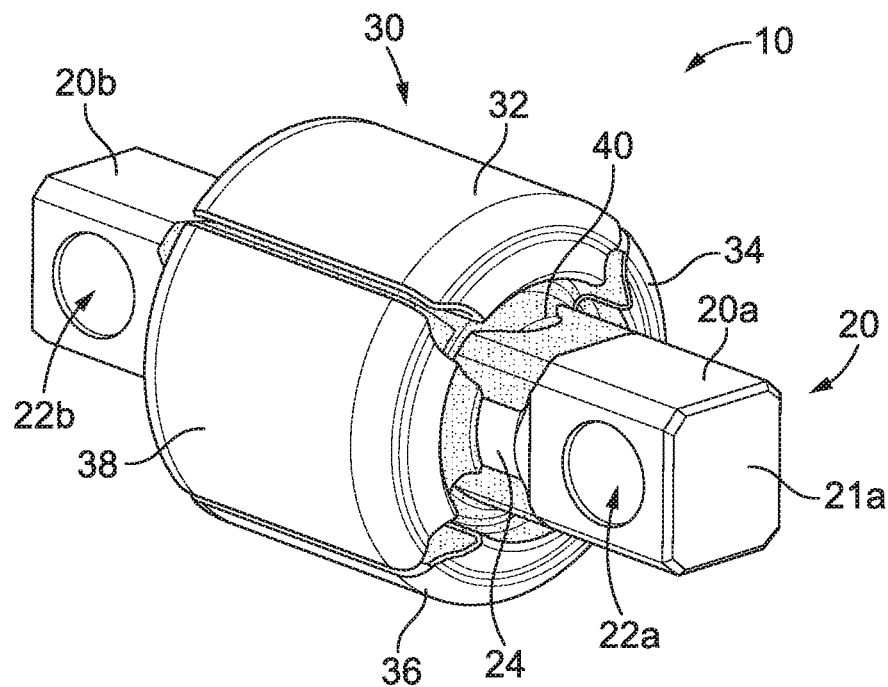
FIG. 1A is a perspective view of an exemplary embodiment of bar pin bushing assembly 10.
Figure 1B:
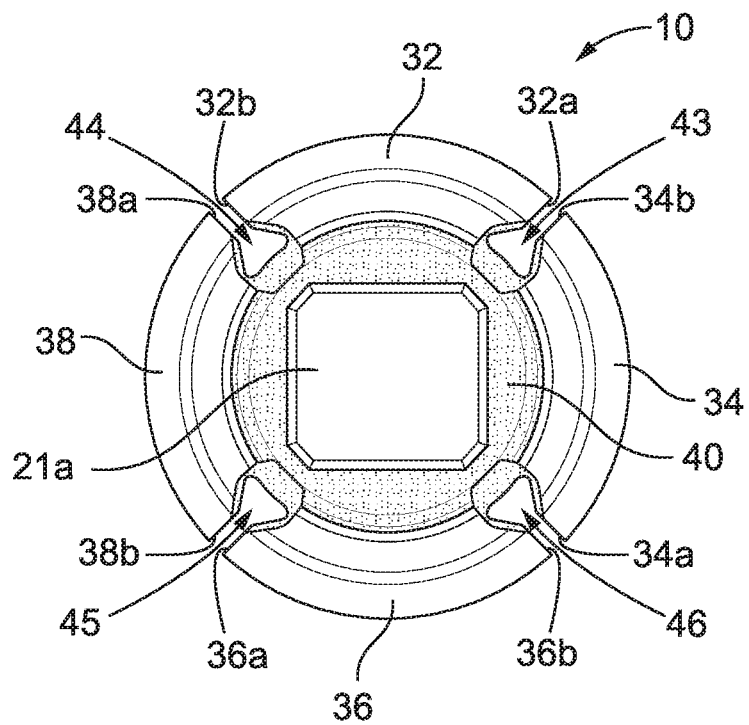
FIG. 1B is a longitudinal right side view of bar pin bushing assembly 10 shown in FIG. 1A.
Figure 2:
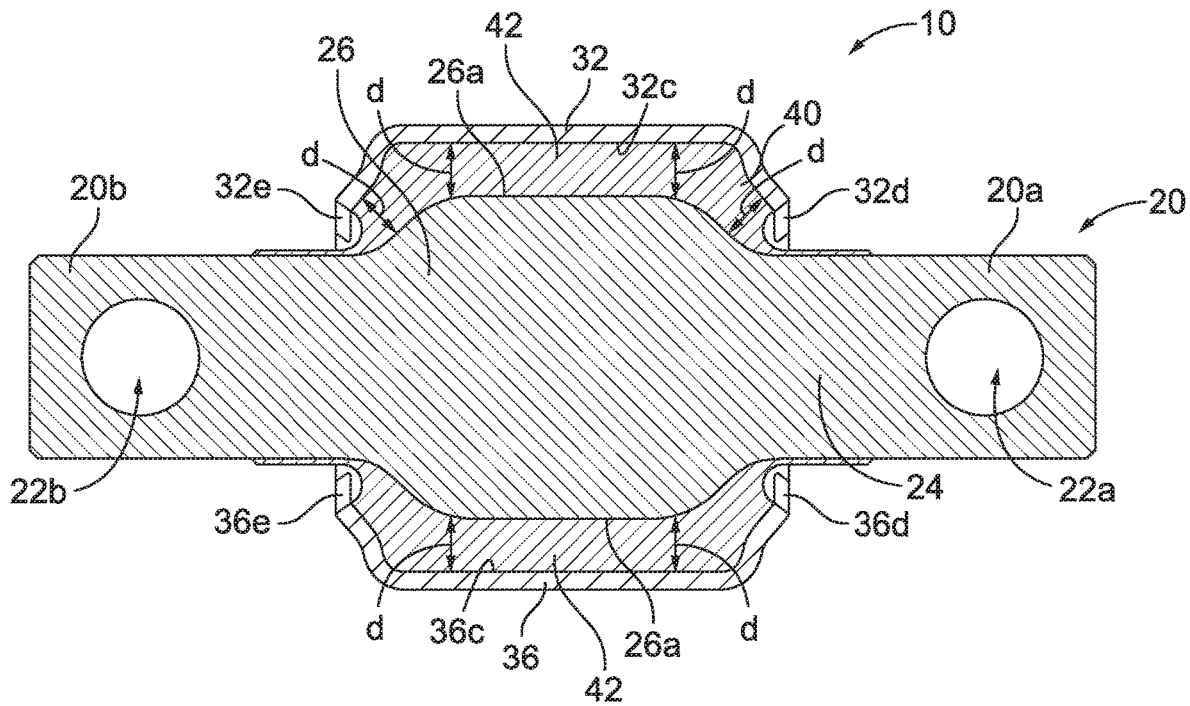
FIG. 2 is a cross-sectional front view of the bar pin bushing assembly 10 shown in FIGS. 1A and 1B.

FIGS. 1A-12C illustrate exemplary embodiments of a bar pin bushing assembly and its components, and a method of assembly. The bar pin bushing assembly shown in the Figures provides a unique spherical bushing design that provides for high radial load-carrying capacity, high axial load-carrying capacity, and high articulation angles. As shown in FIGS. 1A, 1B, and 2, bar pin bushing assembly 10 is shown that includes a bar pin 20 having ends 20a, 20b, and end surface 21a. End 20a includes a through hole 22a that may be used to fasten bar pin bushing assembly 10 to an axle group or other components of a vehicle or suspension. Similarly, end 20b includes a through hole 22b that may be used to fasten bar pin bushing assembly 10 to an axle group or other components of a vehicle or suspension. In particular, bar pin bushing assembly 10 may be used to connect components in a variety of vehicular systems, such as vehicle suspension and axle systems/subsystems, as well as other applications requiring the use of bar pin bushing assemblies for connecting components. As one example, the bar pin bushing assembly 10 may be used to connect a walking beam to an axle bracket in a vehicular suspension/axle system, and is useful in heavy vehicle applications, and could be used in other applications as well. It should be understood that the term "vehicle" is used broadly herein to encompass all kinds of vehicles, including, but not limited to, all forms of cars, trucks, buses, recreational vehicles (RVs), motorcycles, etc. Moreover, for purposes of this description, unless specifically described otherwise, the term "vehicle" herein refers to a vehicle or a trailer. In this way, for example, a vehicle suspension system refers to a vehicle suspension or a trailer suspension.

Bar pin bushing assembly 10 includes an outer sleeve 30 that is made of a plurality of outer metal shell segments 32, 34, 36, and 38 that have been mold bonded to rubber portion 40 positioned over the bar pin 20. FIGS. 1A, 1B, and 2 show bar pin bushing assembly 10 prior to insertion into a beam hub, such as a hub of a walking beam.

As shown in FIG. 1B, a plurality of axial or longitudinal voids 43, 44, 45, and 46 are shown positioned in rubber portion 40. In particular, longitudinal void 43 is positioned beneath a gap between longitudinal edge 32a of outer metal shell 32 and longitudinal edge 34b of outer metal shell 34; longitudinal void 44 is positioned beneath a gap between longitudinal edge 32b of outer metal shell 32 and longitudinal edge 38a of outer metal shell 38; longitudinal void 45 is positioned beneath a gap between longitudinal edge 38b of outer metal shell 38 and longitudinal edge 36a of outer metal shell 36; and longitudinal void 46 is positioned beneath a gap between longitudinal edge 36b of outer metal shell 36 and longitudinal edge 34a of outer metal shell 34.

The longitudinal voids 43, 44, 45, and 46 may be defined, in part, by the configuration of the outer metal shell segments 32, 34, 36, and 38. With references to FIG. 1B, an inner-most portion of the outer metal shell segments 32, 34, 36, and 38 shown in FIG. 1B (i.e., the portions closest to the bar pin 20) have a radial length in radians that is less than a radial length in radians of an outer-most portion of the outer metal shell segments 32, 34, 36, and 38 shown in FIG. 1B. As shown in FIG. 1B, the longitudinal edges 32a, 32b, 34a, 34b, 36a, 36b, 38a, and 38b may include two straight portions and an intermediate portion connecting the two straight portions that is tapered.

When the bushing assembly 10 is inserted into a beam hub the plurality of outer metal shell segments 32, 34, 36, and 38 are forced to move radially inwardly to compress the rubber portion 40 against bar pin 20. As the plurality of outer metal shell segments 32, 34, 36, and 38 are forced radially inwardly during insertion into a beam hub, the gaps between adjacent longitudinal edges of the plurality of outer metal shell segments 32, 34, 36, and 38 are eliminated and they are brought into engagement. At the same time, during compression of rubber section 40, rubber from rubber section 40 is forced into the longitudinal voids 43, 44, 45, and 46 to allow for the rubber section to become compressed. The use of longitudinal voids in the rubber advantageously allows for the control of the amount and direction of rubber bulging during assembly for uniform stress distribution and optimized performance. The use of longitudinal voids in the bushing facilitates rubber bulging in the axial and tangential directions while the bushing assembly 10 is being compressed during insertion into the beam hub.

In the embodiment of bushing assembly 10 shown in FIGS. 1A and 1B, there are four outer metal shell segments 32, 34, 36, and 38 used. However, a fewer or greater number of outer metal shell segments could also be used, although four outer metal shell segments have been found to provide an acceptable design for bushing assembly 10, as if using only three outer metal shell segments, the stress on the rubber section 40 is too high in heavy truck applications, and if using more than four outer metal segments, effective bonding may be lost in heavy truck applications. Each outer metal shell segment may be formed by a stamping process. In other words, each outer metal shell segment may comprise a stamped outer metal shell segment.

FIG. 2 shows a cross-sectional view of the bushing assembly 10 shown in FIGS. 1A and 1B. Bar pin 20 having ends 20a and 20b extends within the outer sleeve 30 and (as shown in FIG. 2) outer metal sleeve segments 32 and 36. In this embodiment, two through holes 22a and 22b are shown to use for attachment to a vehicle or suspension component, such as an axle support member. It is also possible that only a single through hole is provided on bar pin 20, or no through holes are used.

Bar pin 20 includes a central portion 26 that has a greater diameter than the ends 20a and 20b with upwardly and inwardly sloping walls that increase in diameter eventually becoming a flat outer cross-section having a constant outer diameter. A bushing assembly having a bar pin with inwardly and upwardly sloping walls to provide a larger diameter central portion having a uniform thickness rubber section around the central portion, with the rubber section extending around downwardly tapering edges adjacent the central portion in an arc may be referred to as a spherical bushing assembly having a spherical bar pin. The central portion 26 of bar pin 20 having a constant diameter is positioned beneath the outer sleeve 30 of bushing assembly 10 and as shown in FIG. 2 beneath outer metal shell segments 32 and 36. Central portion 26 having a constant diameter extends between arrows showing uniform thickness d of rubber section 42 shown in FIG. 2. Rubber section 40 is mold bonded to the inner surfaces of the plurality of outer metal shell segments including inner surfaces 32c and 36c of outer metal shell segments 32 and 36 shown in FIG. 2. In this embodiment of bushing assembly 10, the rubber section is also mold bonded to bar pin 20 including central portion 26. In addition, downwardly sloping sections adjacent the central portion 26 of bar pin 20 may also be encircled by a rubber section having a thickness d that is the same as the thickness d of the rubber section 42 surrounding the central portion 26 of bar pin 20.

With such a configuration, rubber section 40 includes a rubber section 42 having a uniform thickness. Rubber section 42 may be considered the "working" portion of rubber section 40. Having a rubber section 42 of uniform thickness d provides for significant advantages. In particular, the uniform thickness provides for a uniform stress distribution in the working rubber and maximizes rubber fatigue in comparison to working rubber having a non-uniform thickness which has a lower fatigue performance.

In FIG. 2, the bar pin 20 also includes a circular portion 24 that extends into the outer sleeve. The bushing assembly 10 also provides for a high degree of articulation of the bar pin within the bushing assembly 10. In particular, the outer metal shell segments, including outer metal shell segments 32 and 36 shown in FIG. 2 are "tuned" to allow for the bar pin to articulate at large angles. To provide for the large articulation angles, the ends of the outer metal shell segments including outer metal shell segments 32 and 36 have outer ends 32d, 32e, 36d, and 36e respectively that are configured to allow the bar pin 20 to articulate up to 11.2 degrees from an axial or longitudinal centerline of the bar pin 20, before the circular section 24 contacts ends 32d or 36d of outer metal shell segments 32 and 36 and further articulation is prevented. The same is true of ends 32e and 36e. Smaller or greater angles of articulation may also be provided depending on the application.

Upon insertion of bushing assembly 10 into a beam hub, the working rubber section 42 is precompressed. For example, the rubber section 42 could be compressed 15-25%, or less depending on the application. In one embodiment, the rubber section 42 is compressed from a thickness of 16.25 mm to a thickness of 13 mm upon insertion of the bushing assembly into the beam hub. The rubber sections 40 and 42 may be comprised of natural rubber, although synthetic rubber or other elastomeric material may also be used for the rubber sections.

As noted above, the spherical bushing design of bushing assembly 10 begins with a bar pin 20 which may be a high strength metal such as 1045 or 1144 heat treatable high yield strength steel that may be attached to an axle via fasteners. The bar pin 20 may comprise a forged pin with a rough texture to improve the bonding of rubber to the bar pin 20. A unique rubber shape with uniform wall thickness (rubber section 42) is mold-bonded to the bar pin as well as the outer metal shells. The outer metal shells 32, 34, 36, and 38 are in multiple segments to accommodate rubber shrink after molding and to provide high radial precompression during assembly into the suspension's walking beam hubs. During assembly, the bushing assembly 10 is squeezed together in the radial direction providing high radial and moderate axial precompression. The unique voids 43, 44, 45, and 46 in the bushing facilitate rubber bulging in the axial and tangential directions while it's being compressed during assembly. The large, thin rubber section 42 with high precompression provides high radial and axial load-carrying capacity. The unique rubber shape with rubber in shear during articulation (conical rotation) of the bar pin 20 provides conical compliance and allows high conical angles. The conical angles are controlled via features in the ends of the outer metal shells that limit maximum shear strains in the rubber by limiting the allowable angle of articulation.

In some embodiments, the installed diameter of bushing assembly 10 may be 117 mm and the uninstalled diameter may be 124 mm. The flats on the ends 20a and 20b of bar pin 20 may be 52 mm by 48 mm. The overall length of the bar pin may be 272 mm and the lengths of outer metal shells may be 118 mm, and the outer metal shells may be made of a rigid material such as aluminum, stainless steel, bronze or other suitable material. The outer metal shells may be constructed as stamped, cast or forged shells made out of steel, iron, aluminum or other suitable material. Also, the outer metal shells may have a thickness of 4.76 mm.

Figure 3:
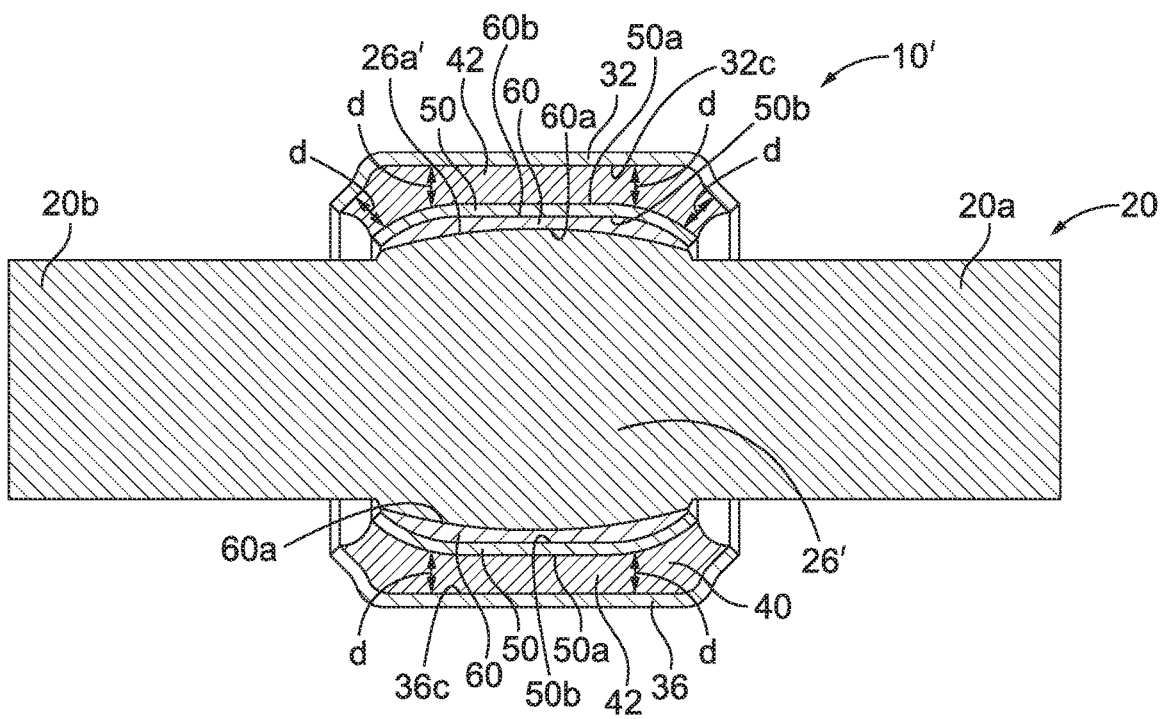
FIG. 3 is a cross-sectional front view of bar pin bushing assembly 10' further including plastic liner 60 and intermediate sleeve 50.

FIG. 3 is a cross-section of bushing assembly 10'. Bushing assembly 10' is constructed in the same manner as bushing assembly 10 shown in FIGS. 1A, 1B, and 2, including a plurality of outer metal shells including outer metal shells 32 and 36 and rubber sections 40 and 42, and bar pin 20 having ends 20a and 20b shown in the cross sectional view of FIG. 2, with a few modifications that will be described herein. In bushing assembly 10', a slip feature is provided that allows for the bar pin 20 to rotate or slip with respect to rubber section 42 and the plurality of outer metal shells. To provide for this slip feature, the rubber section 40 is not mold bonded to a central portion of the bar pin 20, as in bushing assembly 10. Instead, the rubber section 42 having a uniform thickness as in bushing assembly 10, is mold bonded to intermediate sleeve 50 that is positioned between the outer metal shells and the central portion 26' of the bar pin 20. Intermediate sleeve 50 is in turn bonded to plastic liner 60 having inner surface 60a in contact with outer surface 26a' of central portion 26' of bar pin 20. The interface between the inner surface of plastic liner 60a and the outer surface 26a' of bar pin 20 allows for slippage or rotation of outer surface 26a' of bar pin 20 with respect to inner surface 60a of plastic liner 60.

With this construction, the working portion, or rubber section 42, is positioned between the inner surfaces of the outer metal shell segments including inner surface 32c of outer metal shell 32 and inner surface 36c of outer metal shell 36, and the outer surface 50a of intermediate sleeve 50. In addition intermediate sleeve 50 is positioned between rubber section 42 and the upper surface 60b of plastic liner.

The ability to have slippage or rotation between the central portion 26a' of bar pin 20 provides for an increase in conical angles in the bushing assembly 10' while also allowing for the high radial load-carrying capacity of bushing assembly 10'. Bushing assembly 10' has the rubber section 42 mold-bonded to an intermediate sleeve 50 which may be a metal stamping to provide the desired, uniform rubber shape. The ends of the intermediate sleeve may be forced downwardly as shown during insertion into a beam hub. This inner metal stamping may be bonded to a plastic liner 60 which may be a polymer-based liner such as polyurethane that provides free rotation (torsional and conical) and high abrasion resistance. In bushing assembly 10', the metal stamping and plastic or poly liner could be combined by mold-bonding the rubber directly to a combined metal stamping and poly liner. The combination of a highly precompressed rubber bushing and abrasion resistant poly liner insures a relatively tight slip joint over the life of the bushing assembly 10' that resists degradation due to severe environmental conditions (e.g. corrosion).

The intermediate sleeve 50 and plastic liner 60 may also be formed as a plurality of segments in the manner as outer metal shell segments 32, 34, 36, and 38 shown in FIGS. 1A and 1B.

FIG. 4 is a cross-section of bushing assembly 10". Bushing assembly 10" is constructed in the same manner as bushing assembly 10 shown in FIGS. 1A, 1B, and 2, including a plurality of outer metal shells including outer metal shells 32 and 36 and rubber sections 40 and 42, and bar pin 20 having ends 20a and 20b shown in the cross sectional view of FIG. 2, with a few modifications that will be described herein. In bushing assembly 10", similar to bushing assembly 10' shown in FIG. 3, a slip feature is provided that allows for the bar pin 20 to rotate or slip with respect to rubber sections 40 and 42 and the plurality of outer metal shells. To provide for this slip feature in bushing assembly 10", the rubber section 40 is not mold bonded to a central portion of the bar pin 20, as in bushing assembly 10. Instead, the rubber section 42 having a uniform thickness as in bushing assembly 10, is mold bonded to intermediate sleeve 70 that is positioned between the outer metal shells and the central portion 26' of the bar pin 20. A thin rubber layer 80 is also molded beneath the intermediate sleeve 70, such that an upper surface 70a of intermediate sleeve 70 is positioned beneath working rubber section 42 and lower surface 70b of intermediate sleeve 70 is positioned above thin rubber layer 80. The interface between the inner surface of thin rubber layer 80 and outer surface 26'a of bar pin 20 allows for slippage or rotation of outer surface 26a' of bar pin with respect to an inner surface of thin rubber liner 80.

With this construction the working portion, or rubber section 42 is positioned between the inner surfaces of the outer metal shell segments including inner surface 32c of outer metal shell 32 and inner surface 36c of outer metal shell 36, and the outer surface 70a of intermediate sleeve 70.

As noted with regard to bushing assembly 10' shown in FIG. 3, the ability to have slippage or rotation between the central portion 26a' of bar pin 20 and thin rubber layer 80 provides for an increase in conical angles in the bushing 10" while also allowing for high radial load-carrying capacity of bushing assembly 10" while also allowing for high conical angles. Bushing assembly 10" has the rubber section 42 mold-bonded to an intermediate sleeve 70 which may be a metal stamping, cast metal (iron or aluminum), forged steel, or plastic insert to provide the desired, uniform rubber shape. The combination of a highly precompressed rubber bushing with a thin rubber layer insures a relatively tight slip joint over the life of the bushing assembly 10' that resists degradation due to severe environmental conditions (e.g. corrosion).

In bushing assembly 10", the primary "working" rubber section 42 is mold-bonded to the outside of intermediate sleeve 70 which may be a plastic or metal feature. Additionally, there is a secondary thin film of rubber 80 near the central portion 26' of bar pin 20 that allows the bushing to slip under high torsional or conical angles. The rubber film 80 is mold-bonded to the inside surface of the plastic or metal feature and also keeps the joint tight for improved corrosion protection. For both alternative bushing assemblies 10' and 10" shown in FIGS. 3 and 4, the intermediate sleeves or plastic liners (in bushing assembly 10') may be segmented (e.g. segmented via a "slit" or multiple slits in the metal or plastic) to facilitate assembly and high radial precompression. The assembly could take place before or after molding depending on the design details.

Bushing assemblies 10, 10' and 10" shown in FIGS. 1A, 1B, 2, 3, and 4 advantageously include outer metal shells 32, 34, 36, and 38 that are in multiple segments to allow high levels of radial precompression when installed into a suspension's walking beam hubs. The high radial precompression yields high radial stiffness and load-carrying capacity while the spherical shape provides high conical angles for suspension articulation. The curved end features of the outer metal shells 32, 34, 36, and 38 provide axial precompression in the rubber thus high axial load-carrying capacities. The conical angles of articulation are controlled by design features in the ends of the outer metal shells that limit maximum rubber strain levels. Uniquely shaped axial or longitudinal voids 43, 44, 45, and 46 in the rubber (between the outer metal shells) control the amount and direction of rubber bulging during assembly for uniform stress distribution and optimized performance. The inner metal, rubber and outer metal designs of this bushing combined with the method of precompression are designed for uniform stresses in the rubber for maximum bushing fatigue properties. Thus, bushing assemblies 10, 10', and 10" provide for uniform stress distribution for improved bushing fatigue characteristics.

The bushing precompression is applied during assembly into the beam hubs. Because of the unique rubber shape, stress distribution in the rubber is much more uniform. Furthermore, press fitting the precompressed bushing into a beam hub is a very robust method for assembly.

FIGS. 5A-8B are directed to various collar embodiments that may be used to increase the hoop strength of the ends of the outer metal shells and strength of the bushing assembly, and to retain the bushing assembly within a beam hub. In FIGS. 5A-8B, the collar embodiments are illustrated with bushing assembly 10 shown in FIGS. 1A, 1B, and 2. However, the collar embodiments in FIGS. 5A-8B may also be used with bushing assemblies 10' shown in FIG. 3 and bushing assembly 10" shown in FIG. 4, and variants thereof.

FIG. 5A is front view of bar pin bushing assembly 10 after insertion into beam hub 90, with internal structure shown in dotted lines, and FIG. 5B is a cross-sectional front view of bar pin bushing assembly 10 of FIG. 5A shown within beam hub 90. In order to provide additional hoop strength on the ends of the plurality of outer metal shells and retain the bushing assembly 10 within the beam hub 90, a collar 100 may be welded around one end of the bushing assembly and a collar 100a may be welded around the other end of the bushing assembly 10. In particular, as shown in FIG. 5B, the collar 100 may be welded to the outer metal shells (or beam hub) including outer metal shells 32 and 36 along weld line 92 on an end surface of bushing hub 90 and edge of collar 100. Collar 100a may also be welded to the other end of the outer metal shells or beam hub 90. Collar 100a may be configured the same as (or differently) than collar 100. Collar 100a may be welded to the outer metal shells including outer metal shells 32 and 36 along weld line 92a on an end surface of bushing hub 90 and edge of collar 100a. Collars 100 and 100a provide increased strength and rigidity to bushing assembly 10 and increase the hoop strength of the ends of bushing assembly 10. In addition, the collaring configuration shown in FIGS. 5A and 5B is a compact collaring arrangement with very little overall axial extension of the length of the outer metal shells, which may be valuable in applications involving small clearances.

Figure 6A:
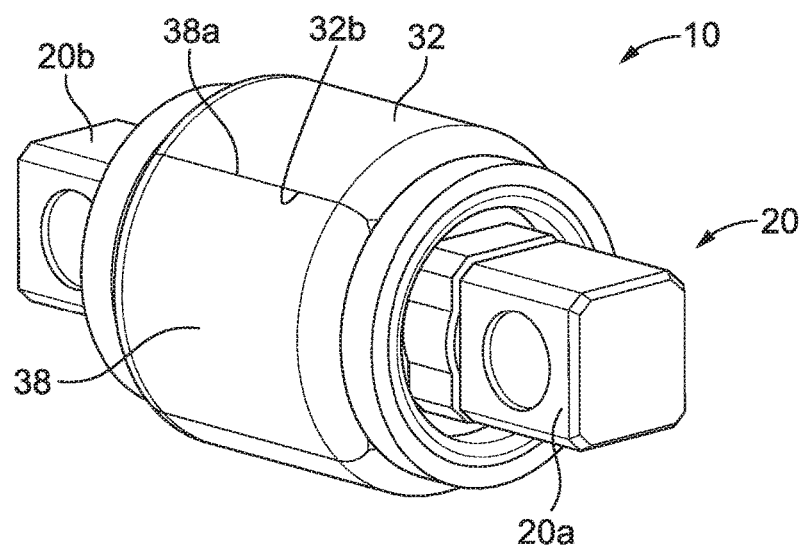
FIG. 6A is a perspective view of bar pin bushing assembly 10 positioned within a beam hub, with the beam hub removed to illustrate how the plurality of outer metal shells move radially inwardly and into engagement to compress the compressible rubber section when inserted within a beam hub.
Figure 6B:
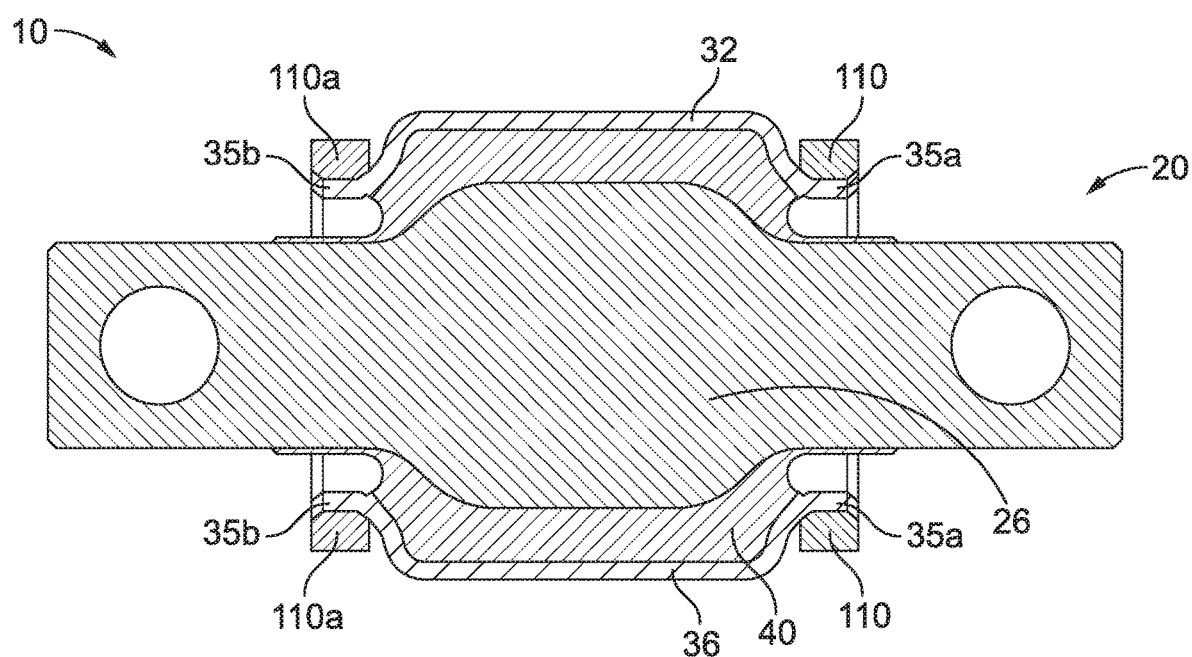
FIG. 6B is a cross-sectional view of bar pin bushing assembly 10 shown in FIG. 6A showing collars 110 and 110a positioned over flanges extending from the ends of the plurality of outer metal shells.

FIG. 6A is a perspective view of bar pin bushing assembly 10 positioned within a beam hub, with the beam hub removed to illustrate how the plurality of outer metal shells have moved radially inwardly and into engagement to compress the compressible rubber section when inserted within a beam hub. In particular the longitudinal edges 32b of outer metal shell 32 and 38a of outer metal shell 38 have been radially compressed during insertion into the beam hub to draw edges 32b and 38a into engagement. FIG. 6B is a cross-sectional view of bar pin bushing assembly 10 shown in FIG. 6A showing collars 110 and 110a positioned on the bushing assembly 10. In this collaring arrangement, flanges 35a extend from a first end of the outer metal shells, including outer metal shells 32 and 36, and collar 110 may be press fit over the extending flanges 35a of the outer metal shells. Similarly, flanges 35b extend from a second end of the outer metal shells, including outer metal shells 32 and 36, and collar 110a may be press fit over the extending flanges 35b of the outer metal shells. A crimping or swaging operation may then be used that further helps the collars 100 to 100a to be held in position. Such a crimping or swaging operation further constrains the collars 100 and 100a.

As with collars 100 and 100a shown in FIG. 5, Collars 110 and 110a provide increased strength and rigidity to bushing assembly 10 and increase the hoop strength of the ends of bushing assembly 10.

Figure 7A:
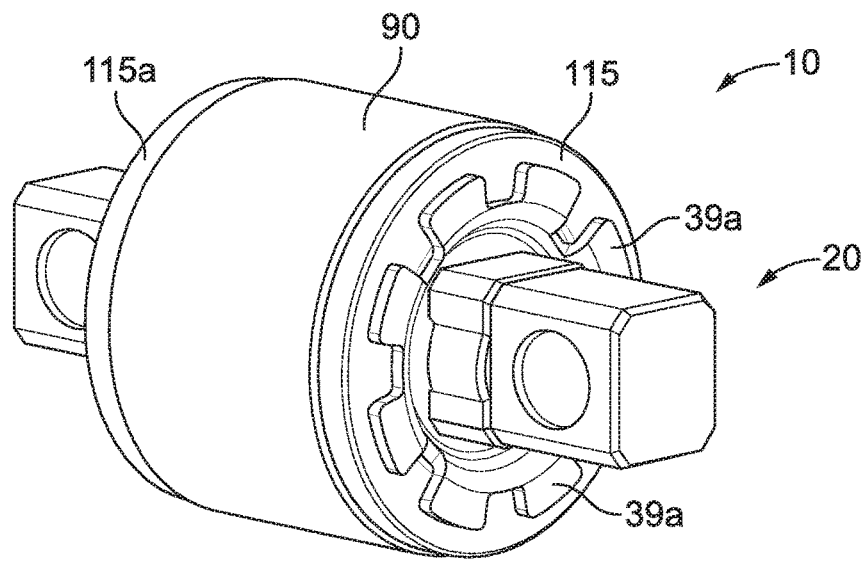
FIG. 7A is a perspective view of bar pin bushing assembly 10 positioned within beam hub 90, and including collars 115 and 115a retained between ends of beam hub 90 and extending flanges of the plurality of outer metal sections.
Figure 7B:
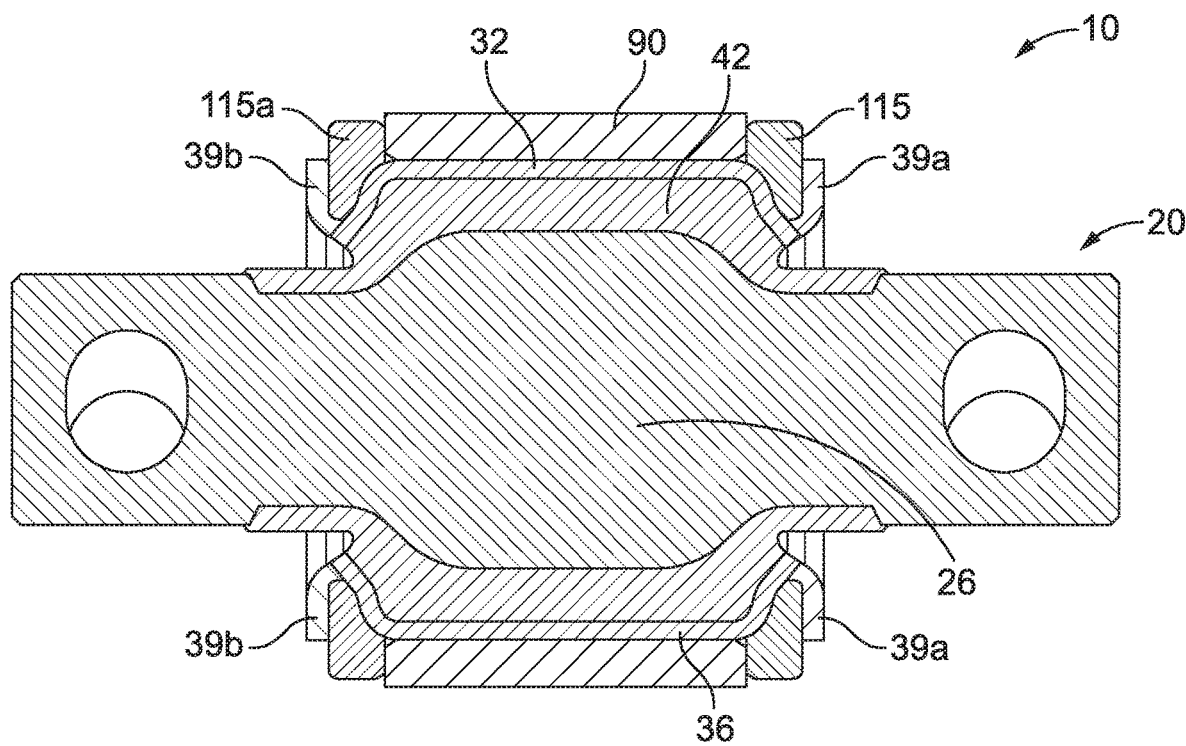
FIG. 7B is a cross-sectional view of bar pin bushing assembly 10 shown in FIG. 7A.

FIG. 7A is a perspective view of bar pin bushing assembly 10 positioned within beam hub 90 and FIG. 7B is a cross-sectional view of bar pin bushing assembly 10 shown in FIG. 7A. Collars 115 and 115a are positioned over the ends of the outer metal shells of bushing assembly 10 including outer metal shells 32 and 36. In this collaring configuration, flanges 39a extend from the outer metal shells on a first end of the bushing assembly 10. Collar 115 is positioned over the flanges 39a, and once in position, flanges 39a are crimped or bent upwardly to retain collar 115 against an end of beam hub 90 to retain collar 115 in position against the end of beam hub 90. Similarly, flanges 39b extend from the outer metal shells on a second end of the bushing assembly 10. Collar 115a is positioned over the flanges 39b, and once in position, flanges 39b are crimped or bent upwardly to retain collar 115a against an end of beam hub 90 to retain collar 115a in position against the end of beam hub 90.

Collars 115 and 115a provide increased strength and rigidity to bushing assembly 10 and increase the hoop strength of the ends of bushing assembly 10. In addition, the collaring configuration shown in FIGS. 7A and 7B is a compact collaring arrangement with very little overall axial extension of the length of the outer metal sleeves, which may be valuable in applications involving small clearances.

Figure 8A:
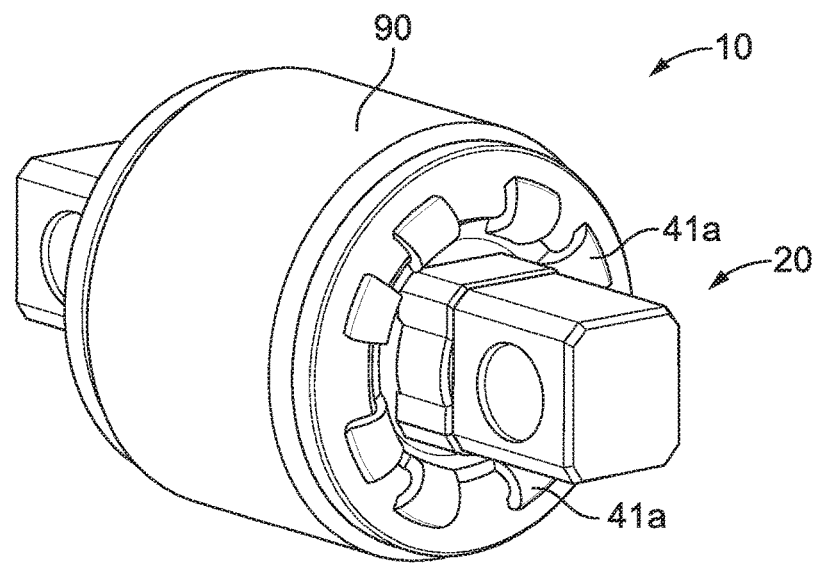
FIG. 8A is a perspective view of bar pin bushing assembly 10 positioned within beam hub 90, and including collars 120 and 120a retained within extending flanges of the plurality of outer metal sections.
Figure 8B:
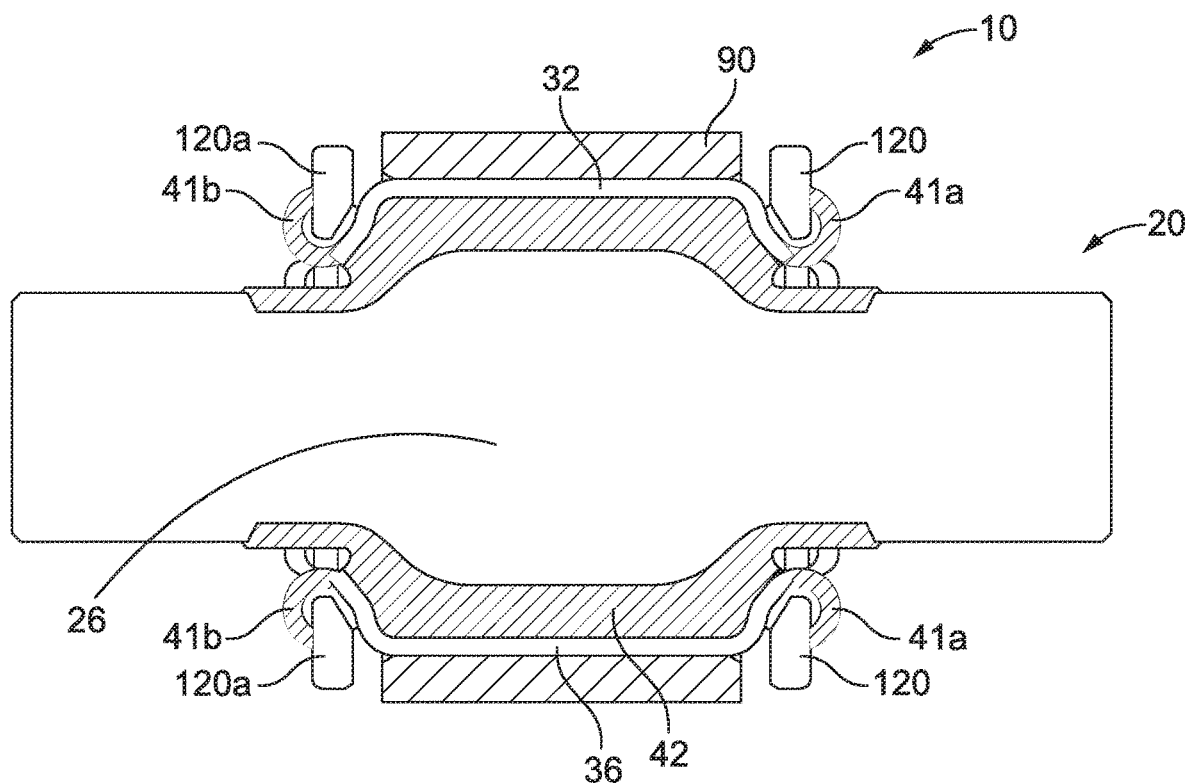
FIG. 8B is a cross-sectional view of bar pin bushing assembly 10 shown in FIG. 8A.

FIG. 8A is a perspective view of bar pin bushing assembly 10 positioned within beam hub 90 and FIG. 8B is a cross-sectional view of bar pin bushing assembly 10 shown in FIG. 8A. In this collaring configuration, collars 120 and 120a are positioned over the ends of the outer metal shells of bushing assembly 10 including outer metal shells 32 and 36. In this collaring configuration, flanges 41a extend from the outer metal shells on a first end of the bushing assembly 10, including outer metal shells 32 and 36. Collar 120 is positioned over the flanges 41a, and once in position, flanges 41a are crimped or bent upwardly to retain collar 120 against a first end of the plurality of outer metal shells to retain collar 120 in position against the ends of the plurality of outer metal shells including outer metal shells 32 and 36. Similarly, flanges 41b extend from the outer metal shells on a second end of the bushing assembly 10. Collar 120a is positioned over the flanges 41b, and once in position, flanges 41b are crimped or bent upwardly to retain collar 120a against the ends of the plurality of outer metal shells including outer metal shells 32 and 36. Collars 120 and 120a provide increased strength and rigidity to bushing assembly 10 and increase the hoop strength of the ends of bushing assembly 10. Variations of the collaring configurations shown in FIGS. 5A-8B may also be provided.

The collars described in FIGS. 5A-8B may be made from cut metal tube, cast, forged, or made from thick washers, as appropriate for the design.

Figure 9A:
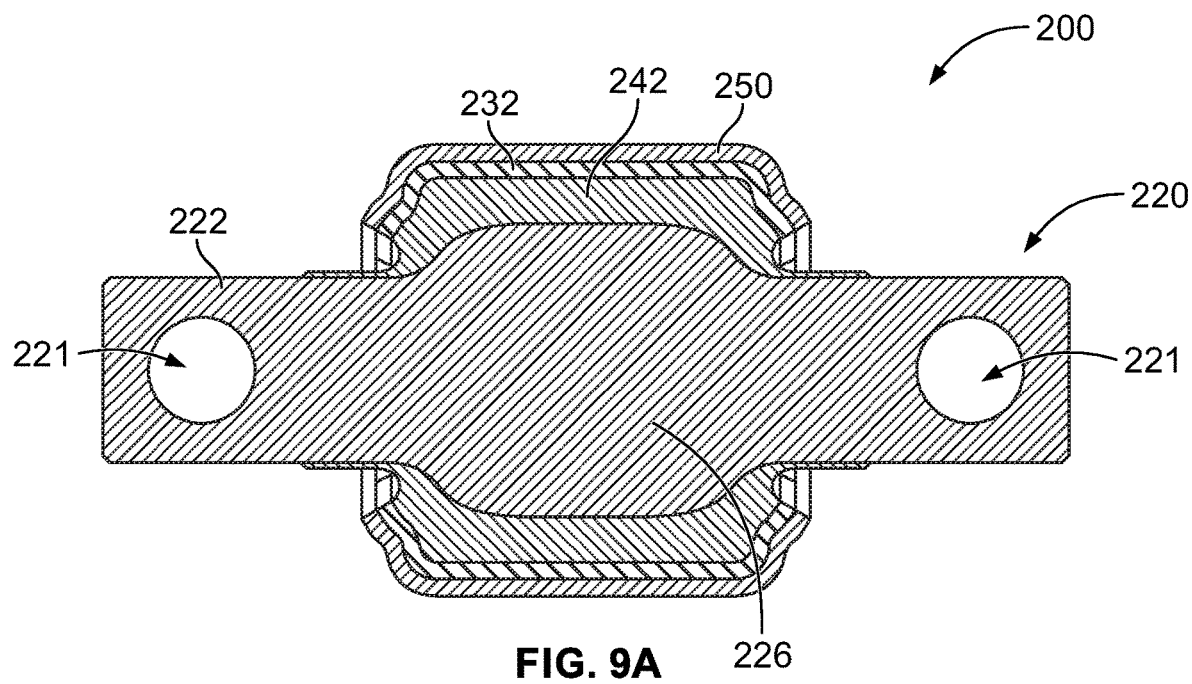
FIG. 9A is a perspective view of bar pin bushing assembly 200, including tubular outer metal wall 250.
Figure 9B:
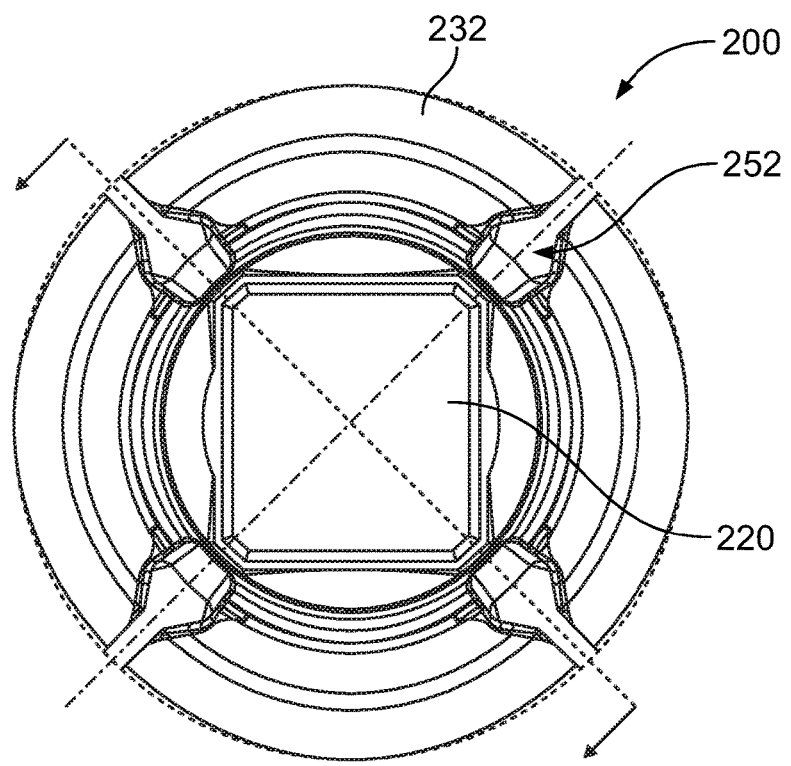
FIG. 9B is an end view of bar pin bushing assembly 200 shown in FIG. 9A, prior to insertion into tubular outer metal wall 250.

FIGS. 9A-G disclose an alternate bar pin bushing assembly 200 that includes a bar pin 220 having oppositely disposed ends. Each end includes a through hole 221 that may be used to fasten bar pin bushing assembly 200 to an axle group or other components of a vehicle or suspension. Bar pin bushing assembly 200 includes an outer metal sleeve 232 that is made of a plurality of outer metal shell segments 232a-d (referred to as outer metal shells) as shown in FIG. 9C that have been mold bonded to rubber portion 242 positioned over the bar pin 220. FIGS. 9B-9D show bar pin bushing assembly 200 prior to insertion into a tubular outer metal wall 250 shown in FIGS. 9E-9G.

Figure 9E:
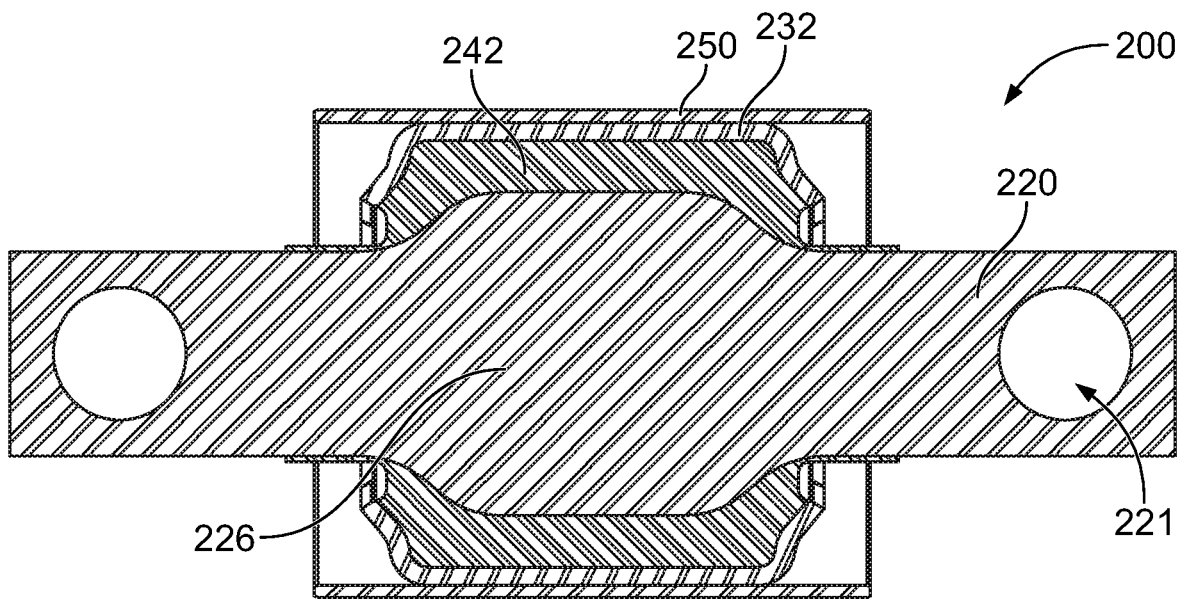
FIG. 9E is a cross-sectional view of bar pin bushing 200 after insertion into tubular outer metal wall 250.
Figure 9F:
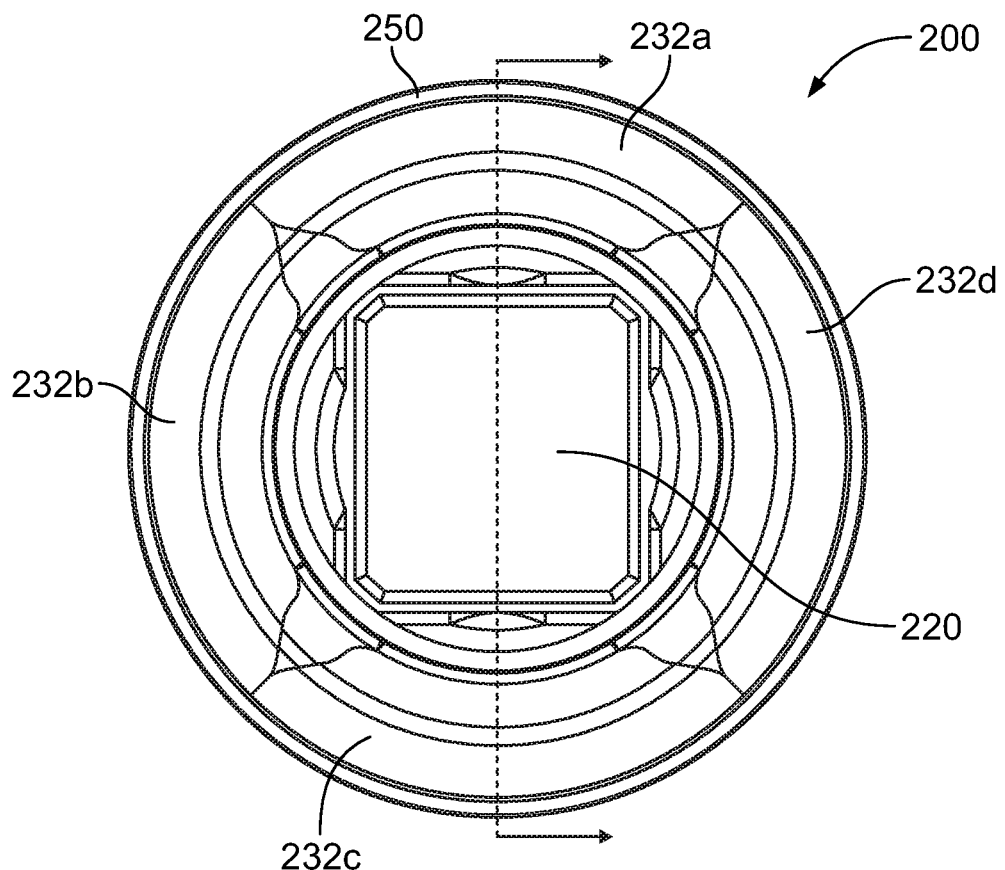
FIG. 9F is an end view of bar pin bushing assembly 200 shown in FIG. 9E.
Figure 9G:
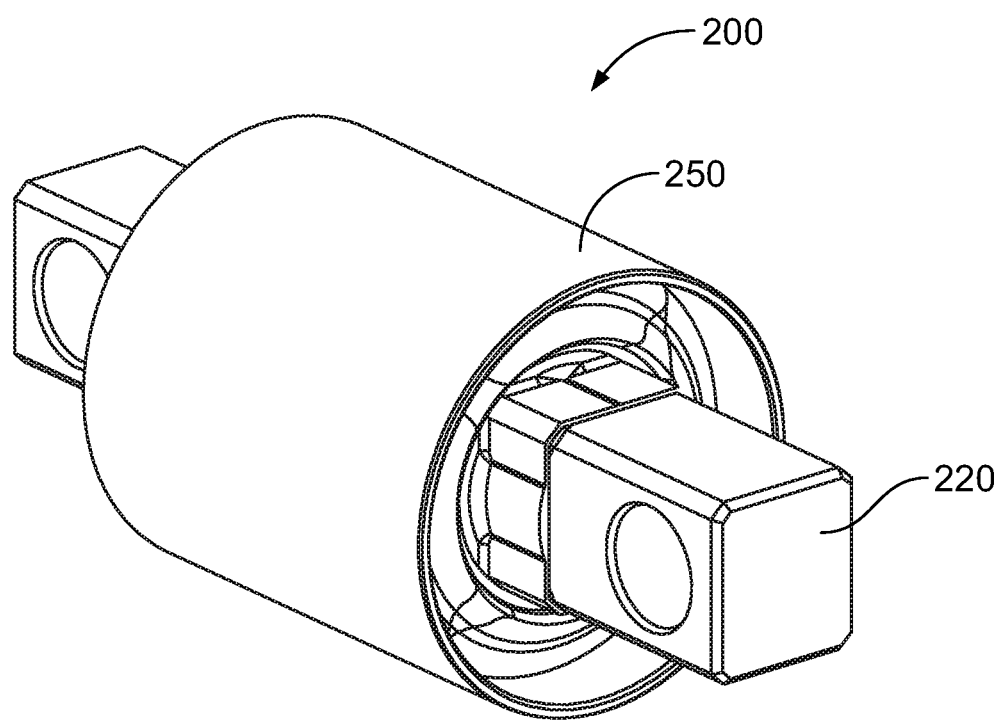
FIG. 9G is a perspective view of bar pin bushing assembly 200 shown in FIGS. 9E and 9F.

As shown in FIG. 9B, a plurality of axial or longitudinal voids 252 are shown positioned in rubber portion 242. The longitudinal voids 252 may be defined, in part, by the configuration of the outer metal shells 232a-d shown in FIG. 9C. Bar pin 220, rubber section 242, and outer metal shells 232a-d may be constructed in the same manner as like elements shown in bar pin bushing assembly 10 shown in FIGS. 1A, 1B, and 2. When the bushing assembly 200 is inserted into the tubular outer metal wall 250 as shown in FIGS. 9E-9G, the plurality of outer metal shells 232a-d are forced to move radially inwardly to compress the rubber portion 242 against bar pin 220. As the plurality of outer metal shells 232a-d are forced radially inwardly during insertion into the tubular outer metal wall 250, the gaps between adjacent longitudinal edges of the plurality of outer metal shells 232a-d are eliminated and they are brought into engagement. At the same time, during compression of rubber section 242, rubber from rubber section 242 is forced into the longitudinal voids 252 to allow for the rubber section to become compressed. The use of longitudinal voids in the rubber advantageously allows for the control of the amount and direction of rubber bulging during assembly for uniform stress distribution and optimized performance. The use of longitudinal voids in the bushing facilitates rubber bulging in the axial and tangential directions while the bushing assembly 200 is being compressed during insertion into the tubular outer metal wall 250.

Upon insertion of bushing assembly 200 into tubular outer metal wall 250, the rubber section 242 is precompressed. For example, the rubber section 242 could be compressed 15-25%, or less depending on the application. In one embodiment, the rubber section 242 is compressed from a thickness of 16.25 mm to a thickness of 13 mm upon insertion of the bushing assembly into the tubular outer metal wall 250. The rubber sections 40 and 42 may be comprised of natural rubber, although synthetic rubber or other elastomeric material may also be used for the rubber sections, and the term "rubber" is defined to cover all compressible materials.

FIGS. 9E-9G show bar pin bushing assembly 200 after the bar pin 220, rubber section 242, and plurality of outer metal shells 232a-d have been inserted into tubular outer metal wall 250. FIG. 9A shows bar pin bushing assembly 200 after ends of tubular outer metal wall 250 have been pushed downwardly to conform to the outer surfaces of the ends of the plurality of outer metal shells 232a-d. In the bar pin bushing assembly 200 the wall thickness of the plurality of outer metal shells 232a-d is generally equal to the wall thickness of the tubular outer metal wall 250. In some embodiments that wall thicknesses may be ⅛ of an inch or 3 mm. The tubular outer metal wall may be made from 1020 drawn over mandrel tube steel, although other metal materials may be used.

Figure 10A:
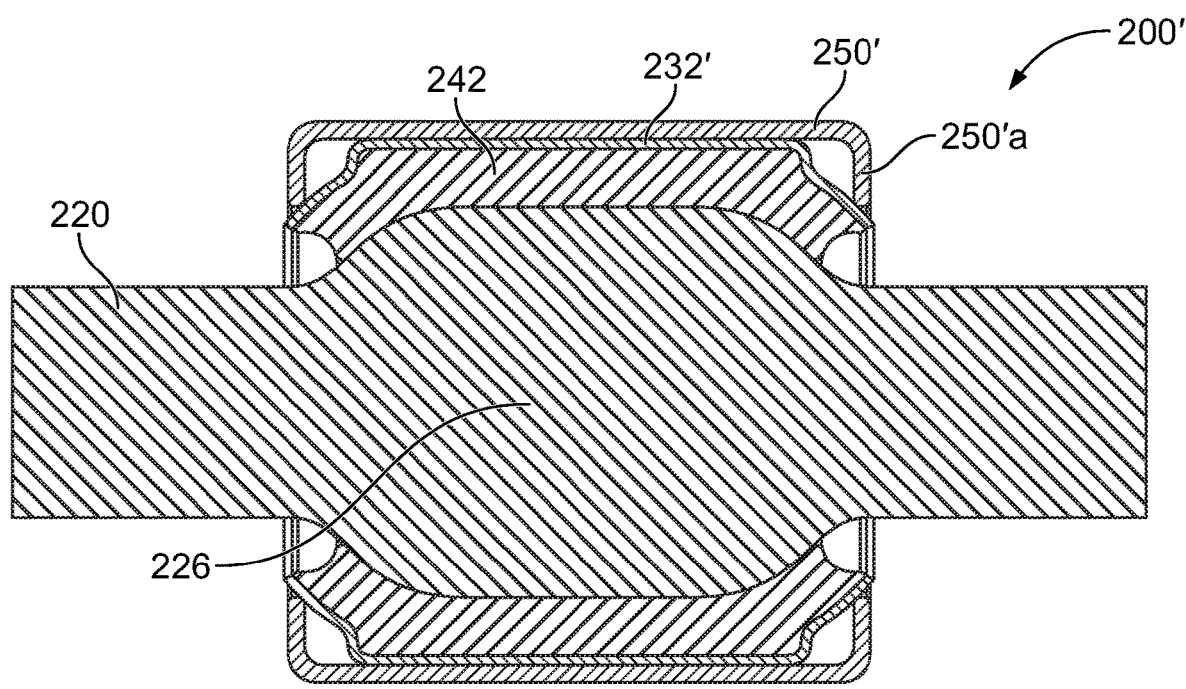
FIG. 10A is a cross-sectional view of bar pin bushing 200'.
Figure 10B:
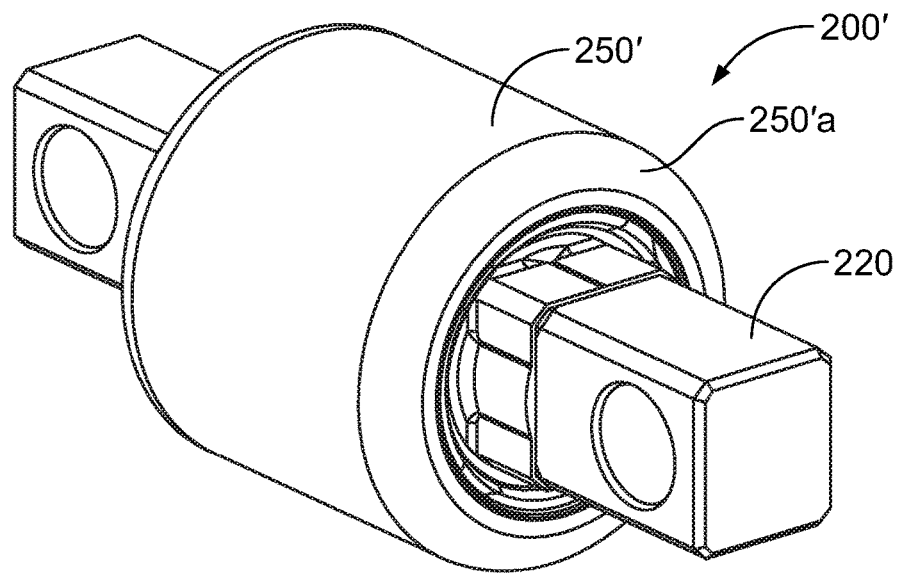
FIG. 10B is perspective view of bar pin bushing 200' shown in FIG. 10A.

FIGS. 10A and 10B show bar pin bushing assembly 200', which is similar to bar pin bushing assembly 200 shown in FIGS. 9A-9G including having the same bar pin 220 and rubber section 242, although with a few differences. In particular, in bar pin bushing assembly 200', the plurality of outer metal shells 232a-d' have a thinner wall thickness than outer metal shells 232a-d in bar pin bushing assembly 200, and the tubular outer metal wall 250' has a greater wall thickness than tubular outer metal wall 250. In some embodiments the tubular outer metal wall may have a wall thickness that is twice the wall thickness of the plurality of outer metal shells 232a-d'. In one embodiment, the tubular outer metal wall 250' may have a wall thickness of 4 mm, while the wall thickness of the plurality of outer metal shells 232a-d' may be 2 mm. Other ratios are also possible.

In addition, in bar pin bushing assembly 200' shown in FIGS. 10A and 10B, the tubular outer metal wall 250' has ends 250a' pushed downwardly at an angle perpendicular to the main surface of tubular outer metal wall 250' such that there is a gap between the inner surfaces of the ends of the tubular outer metal wall 250' and the outer surfaces of the ends of the plurality of outer metal shells 232a-d'. This same approach may also be used with bar pin bushing assembly 200.

Figure 11:
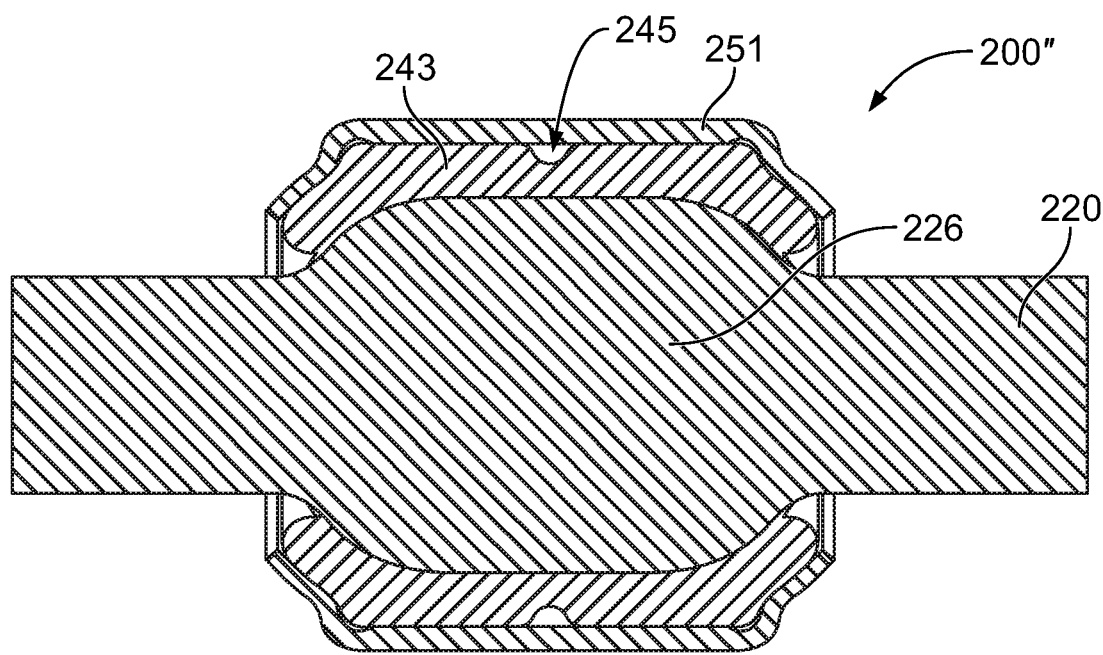
FIG. 11 is a perspective view of bar pin bushing 200".

FIG. 11 shows bar pin bushing assembly 200", an alternate embodiment of bar pin bushing assembly 200. In this embodiment, the bar pin 220 is the same as in bar pin bushing assemblies 200 and 200'. However, in bar pin bushing assembly 200", no plurality of outer metal shells are used. Instead, tubular outer metal wall 251 is positioned over a plurality of lobes (such four lobes) used for rubber section 243, and which may be mold-bonded thereto. In addition, the plurality of lobes may include one or more voids 245 that provide for flow of the rubber section into the voids 245 when the rubber section 243 and bar pin 220 are inserted into tubular outer metal wall 251. In this embodiment, the ends of the tubular outer metal wall 251 have been undercut to provide for thinner ends to facilitate crimping.

It should be noted that the use of a tubular outer metal wall in bar pin bushing assemblies 200, 200', and 200" provides for increased hoop strength at the ends of the plurality of outer metal shells in the case of bar pin bushing assemblies 200 and 200' such that a collar of the types set forth in FIGS. 5A-8B are not required. Thus, the need for such a collar at both ends of the bar pin bushing assembly is not required, providing for reduced complexity in manufacture, and a reduction in parts required. The tubular outer metal wall in bar pin bushing assemblies 200, 200', and 200" has proven to provide sufficient strength and durability to be used on a 48-ton tandem axle applications.

It should be further noted that the bar pin bushing assemblies 200, 200', and 200" also provide for a high degree of articulation of the bar pin within the bushing assembly, in the same manner as described above with respect to bar pin bushing assembly 10. In particular, the outer metal shells and/or tubular outer metal wall are "tuned" to allow for the bar pin to articulate at large angles, in the same manner as described above with respect to bar pin bushing assembly 10.

Figure 12A:
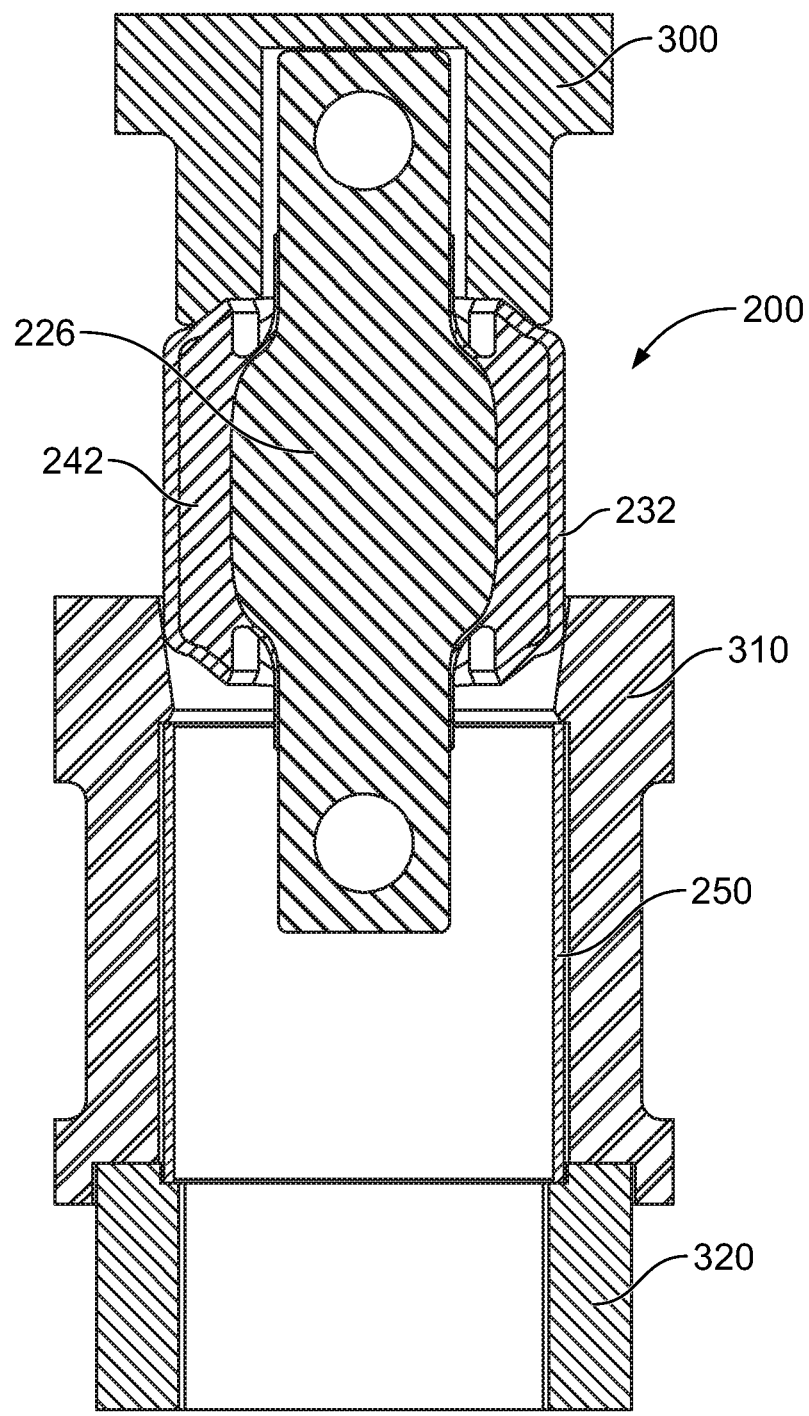
FIG. 12A is a cross-sectional view depicting a first stage in a method of assembly of bar pin bushing 200 shown in FIGS. 9A-9G.
Figure 12B:
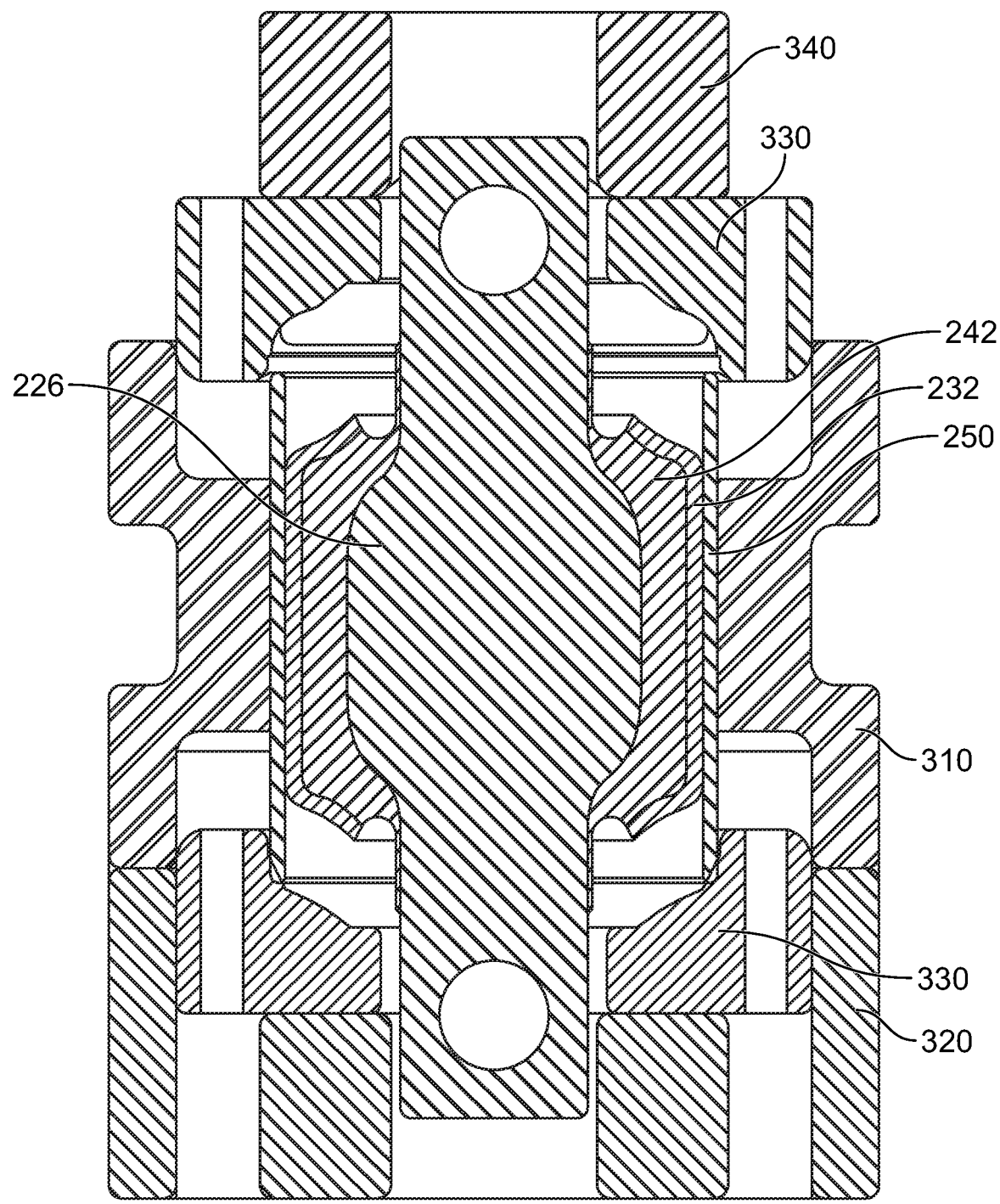
FIG. 12B is a cross-sectional view depicting a second stage in a method of assembly of bar pin bushing 200 shown in FIGS. 9A-9G before a crimping process.
Figure 12C:
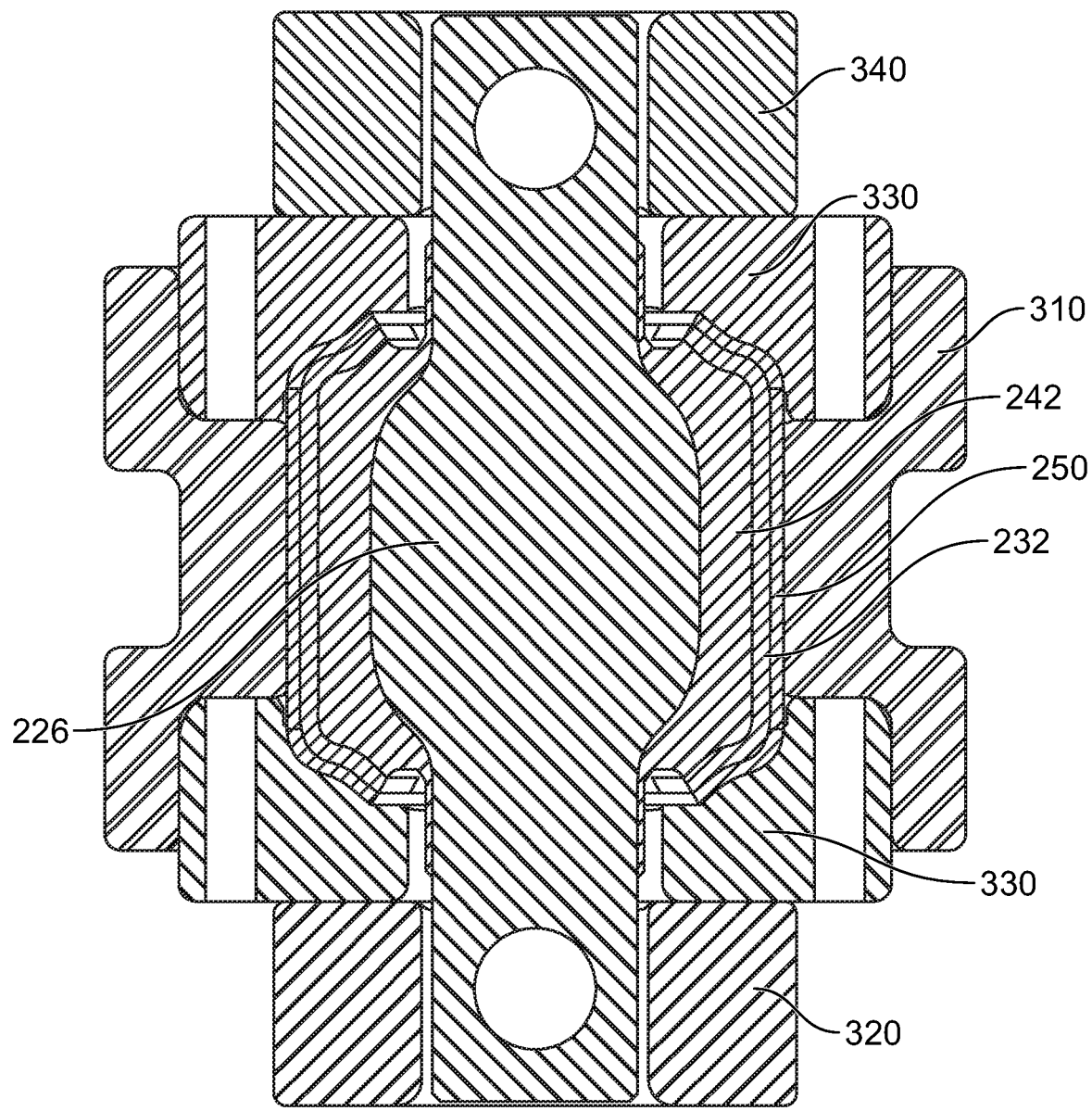
FIG. 12C is a cross-sectional view depicting a third stage in a method of assembly of bar pin bushing 200 shown in FIGS. 9A-9G after a crimping process.

FIGS. 12A-12C show a method of assembly of bar pin bushing assembly 200 including central portion 226 of the bar pin, rubber section 226, and the plurality of outer metal shells (shown collectively as 232). In this method of assembly, as shown in FIG. 12A, tubular metal outer wall 250 is positioned within outer wall restraint 310 which abuts the entire outer surface of tubular metal outer wall 250. Outer wall restraint 310 contains a tapered inner surface that "funnels" the four bushing lobes into the tubular metal outer wall 250. During insertion into the tubular metal outer wall 250, the outer wall restraint 310 helps support the tubular metal outer wall 250 so that it doesn't deform or split during assembly. A lower stop 320 abuts lower end of the tubular metal outer wall 250 and lower end of outer metal wall restraint 310. The bar pin bushing assembly is shown positioned above the tubular outer metal wall 250, and is ready for insertion therein by pushing element 300.

In FIG. 12B, the bar pin bushing assembly 200 has been inserted into the tubular outer metal wall 250. Crimping elements 330 are shown positioned above and below the tubular outer metal wall 250, and pushing block 340 is in position to push the crimping elements 330 into engagement with the outer surfaces of the ends of the tubular outer metal wall.

In FIG. 12C, pushing blocks 340 and 320 have forced the crimping elements 330 into engagement with the ends of tubular outer metal wall 250 and forcing the ends of the tubular outer metal wall 250 into engagement with the ends of the outer surface of the plurality of outer metal shells 232. In this manner, the bar pin bushing may be inserted into the tubular outer metal wall and assembled. This method of assembly may also be used to assemble and/or crimp bar pin bushing assemblies 200' and 200". The structure to assemble the bar pin bushing assemblies may also be designed to include a gap between the inner surfaces of the ends of the tubular metal outer wall and the outer surfaces of the ends of the plurality of outer metal shells as shown in FIGS. 10A and 10B. The crimp and tooling process shown in FIGS. 12A-C are designed to provide an equivalent degree of crimp on both ends of the bar pin bushing assembly.

In addition the intermediate sleeves and liners or rubber layers shown in FIGS. 3 and 4 may be used in bar pin bushing assemblies 200, 200', and/or 200" to provide a rotatable bar pin bushing.

While this invention has been described with reference to certain illustrative aspects, it will be understood that this description shall not be construed in a limiting sense. Rather, various changes and modifications can be made to the illustrative embodiments without departing from the true scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

We claim:

1. A bar pin bushing assembly for connecting components in a vehicular system, the assembly comprising:
    a bar pin having at least one end with at least one bore to receive a fastener, the at least one bore extending through the at least one end, the bar pin having a central portion having a diameter that is greater than a width or diameter of the at least one end of the bar pin;
    a compressible rubber section having a uniform thickness positioned around the central portion of the bar pin, the compressible rubber section further extending around downwardly tapering surfaces adjacent the central portion of the bar pin;
    a plurality of outer metal shells mold bonded to the compressible rubber section;
    wherein when the bushing assembly is inserted into a hub or tubular outer metal wall, the plurality of outer metal shells are configured to radially compress the compressible rubber section to provide a precompressed bushing assembly;
    wherein each of the plurality of outer metal shells has first and second longitudinal edges that are forced into engagement with the edge of an adjacent outer metal shell when the bushing assembly is inserted into the hub; and
    wherein longitudinal voids are positioned in the compressible rubber section between adjacent edges of the outer metal shells; wherein the longitudinal voids are positioned in the compressible rubber section, and wherein rubber on an outer surface of the compressible rubber section is forced into the longitudinal voids between and radially outwardly from the compressible rubber section when the bushing assembly is inserted into the hub.

2. The bar pin bushing assembly of claim 1 wherein the compressible rubber section is mold bonded to the bar pin.

3. The bar pin bushing assembly of claim 1 wherein ends of the plurality of outer metal shells are tuned to limit angular movement of the bar pin.

4. The bar pin bushing assembly of claim 3 wherein the ends of the plurality of outer metal shells are tuned to limit angular movement of the bar pin to no more than 11.2 degrees.

5. The bar pin bushing assembly of claim 1 wherein the bushing assembly is inserted into the hub the compressible rubber section is compressed 15-25% from an outer diameter of the compressible rubber section prior to insertion into the hub.

6. The bar pin bushing assembly of claim 1 further including a plastic liner positioned over the central portion of the bar pin and an intermediate sleeve bonded to an outer surface of the plastic liner; wherein the compressible rubber section having a uniform thickness is mold bonded to an outer surface of the intermediate sleeve, and extends between inner surfaces of the plurality of outer metal shells and the outer surface of the intermediate sleeve; and
    wherein the bar pin is rotatable with respect to the plastic liner, intermediate sleeve, compressible rubber section, and plurality of outer metal shells.

7. The bar pin bushing assembly of claim 6 wherein the plastic liner comprises polyurethane.

8. The bar pin bushing assembly of claim 1 wherein the compressible rubber section comprises natural rubber.

9. The bar pin bushing assembly of claim 1 further including a rubber layer positioned over the central portion of the bar pin and an intermediate sleeve bonded to an outer surface of the rubber layer; wherein the compressible rubber section having a uniform thickness is mold bonded to an outer surface of the intermediate sleeve, and extends between inner surfaces of the plurality of outer metal shells and the outer surface of the intermediate sleeve; and
    wherein the bar pin is rotatable with respect to the rubber layer, intermediate sleeve, compressible rubber section, and plurality of outer metal shells.

10. The bar pin bushing assembly of claim 1 wherein after the bushing assembly is inserted into the hub, a first collar is adapted to be welded to first ends of the plurality of outer metal shells and a second collar is adapted to be welded to second ends of the plurality of outer metal shells.

11. The bar pin bushing assembly of claim 1 wherein the plurality of outer metal shells comprises four outer metal shells.

12. The bar pin bushing assembly of claim 11 wherein the four outer metal shells have the same size and shape.

13. The bar pin bushing assembly of claim 1 wherein the central section of the bar pin is spherical.

14. The bar pin bushing assembly of claim 1 wherein after the bushing assembly is inserted into the hub, a first collar is adapted to be positioned over longitudinal flanges extending from first ends of the plurality of outer metal shells, and a second collar is adapted to be positioned over longitudinal flanges extending from second ends of the plurality of outer metal shells.

15. The bar pin bushing assembly of claim 1 wherein a first collar is adapted to be press fit over longitudinal flanges extending from the first ends of the outer metal shells, and a second collar is adapted to be press fit over the longitudinal flanges extending from the second ends of the outer metal shells; and wherein the first and second collars are adapted to be crimped or swaged over the longitudinal flanges extending from outer metal shells.

16. The bar pin bushing assembly of claim 1 wherein after the bushing assembly is inserted into the hub, a first collar is adapted to be positioned over first ends of the plurality of outer metal shells and retained between a first end of the hub and crimped flanges extending from the first ends of the plurality of outer metal shells, and a second collar is adapted to be positioned over second ends of the plurality of outer metal shells and retained between a second end of the hub and crimped flanges extending from second ends of the plurality of outer metal shells.

17. The bar pin bushing assembly of claim 1 wherein after the bushing assembly is inserted into the hub, a first collar is adapted to be positioned over first ends of the plurality of outer metal shells and retained within crimped tabs extending from the first ends of the plurality of outer metal shells, and a second collar is adapted to be positioned over second ends of the plurality of outer metal shells and retained within crimped tabs extending from the second ends of the plurality of outer metal shells.

18. The bar pin bushing assembly of claim 1, wherein the plurality of outer metal shells and compressible rubber section are positioned within a tubular outer metal wall and the compressible rubber section is compressed upon insertion into the tubular outer metal wall to provide a precompressed bushing assembly.

19. The bar pin bushing assembly of claim 18, wherein the plurality of outer metal shells and the tubular outer metal wall have the same wall thickness.

20. The bar pin bushing assembly of claim 18, wherein the tubular outer metal wall has a wall thickness greater than a wall thickness of the plurality of outer metal shells.

21. The bar pin bushing assembly of claim 18, wherein an inner surface of the tubular outer metal wall conforms to ends of the plurality of outer metal shells.

22. The bar pin bushing assembly of claim 18, wherein ends of the tubular outer metal wall extend perpendicularly from the tubular outer metal wall such that a gap exists between inner surfaces of the ends of the tubular outer metal wall and outer surfaces of the ends of the plurality of outer metal shells.

23. The bar pin bushing assembly of claim 18 wherein the compressible rubber section is mold bonded to the bar pin.

24. The bar pin bushing assembly of claim 18 wherein each of the plurality of outer metal shells has first and second longitudinal edges that are forced into engagement with the edge of an adjacent outer metal shell when the bushing assembly is inserted into the tubular outer metal wall.

25. The bar pin bushing assembly of claim 18 wherein longitudinal voids are positioned in the compressible rubber section between adjacent edges of the outer metal shells;

and wherein rubber on an outer surface of the compressible rubber section is forced into the longitudinal voids when the bushing assembly is inserted into the tubular outer metal wall.

26. The bar pin bushing assembly of claim 18 further including a plastic liner positioned over the central portion of the bar pin and an intermediate sleeve bonded to an outer surface of the plastic liner; wherein the compressible rubber section having a uniform thickness is mold bonded to an outer surface of the intermediate sleeve, and extends between inner surfaces of the plurality of outer metal shells and the outer surface of the intermediate sleeve; and wherein the bar pin is rotatable with respect to the plastic liner, intermediate sleeve, compressible rubber section, plurality of outer metal shells, and tubular outer metal wall.

27. The bar pin bushing assembly of claim 18 further including a rubber layer positioned over the central portion of the bar pin and an intermediate sleeve bonded to an outer surface of the rubber layer; wherein the compressible rubber section having a uniform thickness is mold bonded to an outer surface of the intermediate sleeve, and extends between inner surfaces of the plurality of outer metal shells and the outer surface of the intermediate sleeve; and wherein the bar pin is rotatable with respect to the rubber layer, intermediate sleeve, compressible rubber section, plurality of outer metal shells, and tubular outer metal wall.

* * * * *